United States Patent
Hu et al.

(10) Patent No.: US 10,200,105 B2
(45) Date of Patent: Feb. 5, 2019

(54) ANTENNA TUNING COMPONENTS IN PATTERNED CONDUCTIVE LAYERS

(71) Applicant: Apple Inc., Cupertino, CA (US)

(72) Inventors: Hongfei Hu, Cupertino, CA (US); Yi Jiang, Cupertino, CA (US); Ming-Ju Tsai, Sunnyvale, CA (US); Enrique Ayala Vazquez, Watsonville, CA (US); Erdinc Irci, Sunnyvale, CA (US); Jiangfeng Wu, San Jose, CA (US); Lijun Zhang, San Jose, CA (US); Siwen Yong, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/638,060

(22) Filed: Jun. 29, 2017

(65) Prior Publication Data

US 2019/0007120 A1   Jan. 3, 2019

(51) Int. Cl.
*H01Q 21/28* (2006.01)
*H04B 7/06* (2006.01)
(Continued)

(52) U.S. Cl.
CPC ........... *H04B 7/0689* (2013.01); *H01Q 1/243* (2013.01); *H01Q 9/0421* (2013.01); *H01Q 21/28* (2013.01); *H04B 1/401* (2013.01); *H04B 7/0602* (2013.01)

(58) Field of Classification Search
CPC ............. H01Q 1/24; H01Q 9/04; H01Q 21/28
(Continued)

(56) References Cited

U.S. PATENT DOCUMENTS 6,919,862 B2   7/2005   Hacker et al.
7,157,987 B2   1/2007   Brunker et al.
(Continued)

FOREIGN PATENT DOCUMENTS

JP   2012222701   11/2012
WO   2015000181   1/2015

OTHER PUBLICATIONS

Agneessens et al., "Compact Half Diamond Dual-Band Textile HMSIW On-body Antenna" IEEE Transactions of Antennas and Propagation, vol. 62, No. 5, 2014, pp. 2374-2381.
(Continued)

*Primary Examiner* — Andrea Lindgren Baltzell
(74) *Attorney, Agent, or Firm* — Treyz Law Group, P.C.; Michael H. Lyons

(57) ABSTRACT

An electronic device may include a peripheral conductive housing wall. The housing wall may be patterned to form first and second continuous regions defining opposing edges of a patterned region. The patterned region may include slots that divide the wall into conductive structures between the first and second continuous regions. A tuning element for an antenna in the device may be formed from the conductive structures and the slots in the patterned region. The slots and the conductive structures in the patterned region may be configured to mitigate any excessive capacitances between the first and second continuous regions in one or more desired frequency bands to optimize antenna efficiency. The slots may be narrow enough so as to be invisible to the un-aided human eye. This may configure the first and second continuous regions to appear to a user as a single continuous piece of conductor.

20 Claims, 14 Drawing Sheets

(51) Int. Cl.
    *H01Q 1/24*     (2006.01)
    *H01Q 9/04*     (2006.01)
    *H04B 1/401*     (2015.01)

(58) Field of Classification Search
    USPC ............................................................ 343/702
    See application file for complete search history.

(56) References Cited

U.S. PATENT DOCUMENTS

| | | |
|---|---|---|
| 7,456,793 B2 | 11/2008 | Napoles et al. |
| 7,884,315 B2 | 2/2011 | Andre et al. |
| 8,270,914 B2 | 9/2012 | Pascolini et al. |
| 8,446,333 B2 | 5/2013 | Zhu et al. |
| 8,643,547 B2 | 2/2014 | Hong et al. |
| 8,896,487 B2 | 11/2014 | Chiang et al. |
| 8,941,550 B2 | 1/2015 | Whitmore et al. |
| 9,653,806 B2 | 5/2017 | Ying |
| 2011/0014879 A1 | 1/2011 | Alberth et al. |
| 2012/0032858 A1 | 2/2012 | Chang et al. |
| 2013/0293425 A1 | 11/2013 | Zhu et al. |
| 2014/0126172 A1 | 5/2014 | Fahlgren et al. |
| 2014/0361932 A1 | 12/2014 | Irci et al. |
| 2016/0064801 A1 | 3/2016 | Han et al. |
| 2016/0093941 A1* | 3/2016 | Hsu .................... H01Q 1/243 455/575.7 |
| 2016/0192482 A1* | 6/2016 | Radi .................... H05K 3/048 343/700 MS |
| 2016/0248148 A1 | 8/2016 | Hill et al. |
| 2016/0308271 A1 | 10/2016 | Jin et al. |
| 2017/0117754 A1 | 4/2017 | Noori et al. |
| 2017/0125889 A1 | 5/2017 | Pascolini et al. |

OTHER PUBLICATIONS

Rai et al., "Design of Compact Ultra Wide Band Antenna for Wireless Communication System" Proceedings of the Sixth International Conference on Computer and Communication Technology 2015, ACM 2015, pp. 1-4.
Jiang et al., U.S. Appl. No. 15/602,956, filed May 23, 2017.
Hu et al., U.S. Appl. No. 14/829,008, filed Aug. 18, 2015.
Mow et al., U.S. Appl. No. 15/217,805, filed Jul. 22, 2016.
Han et al., U.S. Appl. No. 15/602,972, filed May 23, 2017.

* cited by examiner

ANTENNA TUNING COMPONENTS IN PATTERNED CONDUCTIVE LAYERS

BACKGROUND

This relates generally to electronic devices and, more particularly, to electronic devices with wireless communications circuitry.

Electronic devices often include wireless circuitry with antennas. For example, cellular telephones, computers, and other devices often contain antennas for supporting wireless communications.

It can be challenging to form electronic device antenna structures with desired attributes. In some wireless devices, the presence of conductive structures such as conductive housing structures can influence antenna performance. Antenna performance may not be satisfactory if the housing structures are not configured properly and interfere with antenna operation. Device size can also affect performance. It can be difficult to achieve desired performance levels in a compact device, particularly when the compact device has conductive housing structures and is used in a variety of operating environments.

It would therefore be desirable to be able to provide improved wireless circuitry for electronic devices such as electronic devices that include conductive housing structures.

SUMMARY

An electronic device may be provided with wireless circuitry. The wireless circuitry may include an antenna and transceiver circuitry. The antenna may include an antenna resonating element, an antenna ground, an antenna feed having a first feed terminal coupled to the resonating element and a second feed terminal coupled to the antenna ground, and an antenna tuning element that contributes to the response of the antenna (e.g., to adjust the overall frequency response and in-band antenna efficiency of the antenna).

The electronic device may include a conductive layer such as a peripheral conductive wall of an electronic device housing. The conductive housing wall may include first and second continuous or solid regions that define opposing edges of a patterned region. The patterned region may include multiple slots that divide the conductive housing wall into conductive structures between the first and second continuous regions. The antenna tuning element may be formed from the conductive structures and the slots in the patterned region of the conductive housing wall. In one suitable arrangement, the antenna tuning element may be an antenna tuning capacitor. In this scenario, the conductive structures may include a one or two-dimensional array of conductive patches that exhibit series-coupled capacitances between the first and second continuous regions of the conductive housing wall. In another suitable arrangement, the antenna tuning element may be an antenna tuning inductor. In this scenario, the conductive structures may include a meandering conductive path coupled between the first and second continuous regions of the conductive housing wall.

The antenna tuning component formed from the patterned region of the conductive housing wall may be configured to reduce the overall capacitance between the antenna resonating element and the antenna ground relative to scenarios where no conductive material is formed between the first and second continuous regions. In this way, the antenna tuning components may mitigate any excessive capacitances between the first and second continuous regions to optimize antenna efficiency within one or more desired frequency bands. The slots in the patterned region of the conductive housing wall may be narrow enough so as to be invisible to the un-aided human eye (e.g., less than 100 microns in width). This may, for example, allow the first and second continuous regions of the conductive housing wall to appear to a user of the electronic device as a single continuous piece of conductor despite the fact that an antenna tuning element is formed between the first and second continuous regions.

DETAILED DESCRIPTION

Figure 1:
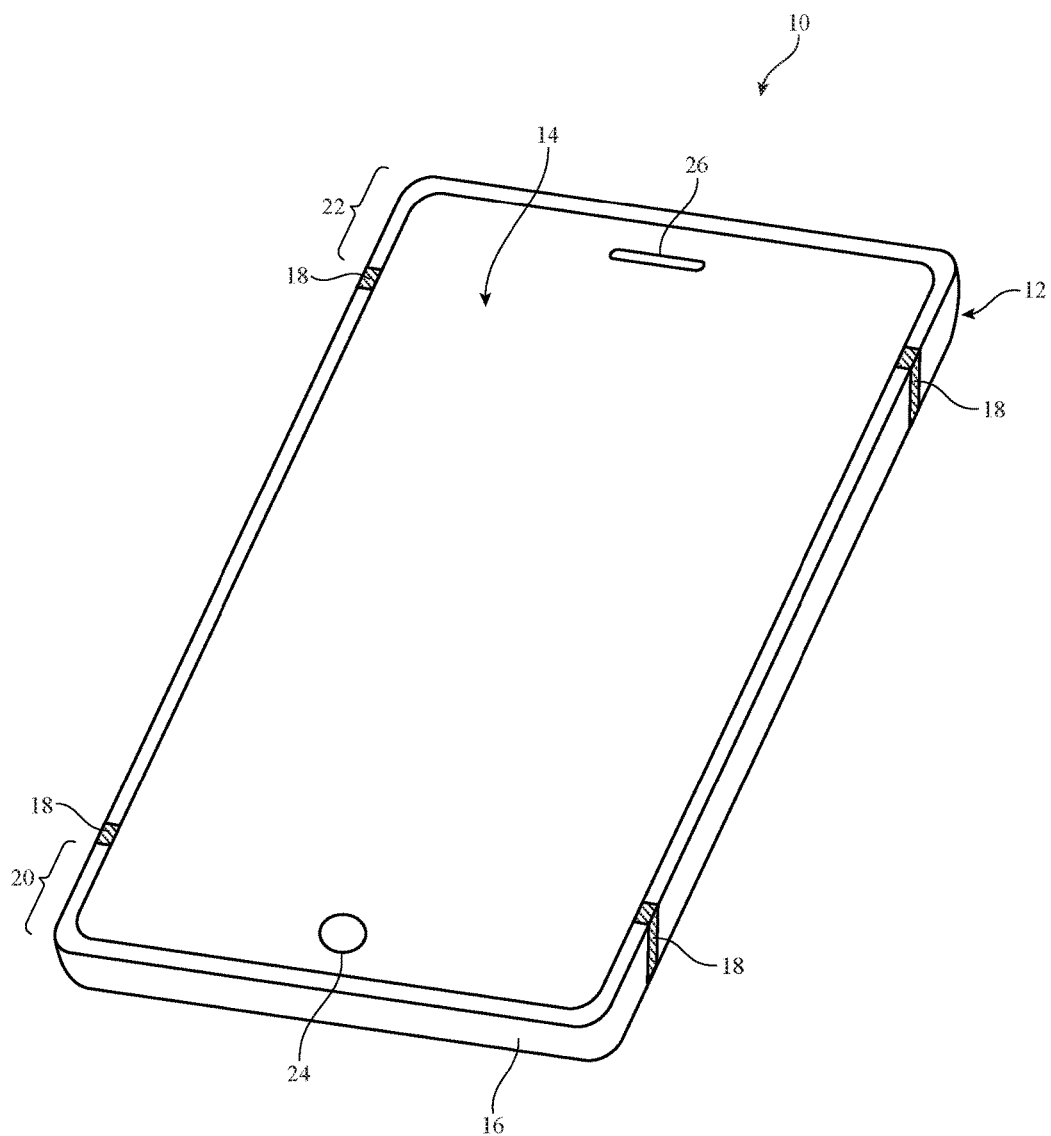
FIG. 1 is a perspective view of an illustrative electronic device in accordance with an embodiment.

Electronic devices such as electronic device 10 of FIG. 1 may be provided with wireless communications circuitry. The wireless communications circuitry may be used to support wireless communications in multiple wireless communications bands.

The wireless communications circuitry may include one or more antennas. The antennas of the wireless communications circuitry can include loop antennas, inverted-F antennas, strip antennas, planar inverted-F antennas, slot antennas, dipole antennas, monopole antennas, helical antennas, hybrid antennas that include antenna structures of more than one type, or other suitable antennas. Conductive structures for the antennas may, if desired, be formed from conductive electronic device structures.

The conductive electronic device structures may include conductive housing structures. The housing structures may include peripheral structures such as peripheral conductive structures that run around the periphery of an electronic device. The peripheral conductive structure may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane formed from conductive housing structures such as metal housing midplate structures and other internal device structures. Rear housing wall structures may be used in forming antenna structures such as an antenna ground.

Electronic device 10 may be a portable electronic device or other suitable electronic device. For example, electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment is mounted in a kiosk, building, vehicle, or automobile, a wireless access point or base station, a desktop computer, a keyboard, a gaming controller, a computer mouse, a mousepad, a trackpad or touchpad device, equipment that implements the functionality of two or more of these devices, or other electronic equipment. Other configurations may be used for device 10 if desired. The example of FIG. 1 is merely illustrative.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch.

Display 14 may include pixels formed from light-emitting diodes (LEDs), organic LEDs (OLEDs), plasma cells, electrowetting pixels, electrophoretic pixels, liquid crystal display (LCD) components, or other suitable pixel structures. A display cover layer such as a layer of clear glass or plastic may cover the surface of display 14 or the outermost layer of display 14 may be formed from a color filter layer, thin-film transistor layer, or other display layer. Buttons such as button 24 may pass through openings in the cover layer or may be formed under the cover layer if desired. The cover layer may include openings such as an opening for speaker port 26 if desired.

Housing 12 may include peripheral housing structures such as structures 16. Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may also, if desired, form sidewall structures for device 10 (e.g., by forming a metal band with vertical sidewalls, curved sidewalls, etc.).

Peripheral housing structures 16 may be formed of a conductive material such as metal and may therefore sometimes be referred to as peripheral conductive housing structures, conductive housing structures, peripheral metal structures, or a peripheral conductive housing member (as examples). Peripheral housing structures 16 may be formed from a metal such as stainless steel, aluminum, or other suitable materials. One, two, or more than two separate structures may be used in forming peripheral housing structures 16.

It is not necessary for peripheral housing structures 16 to have a uniform cross-section. For example, the top portion of peripheral housing structures 16 may, if desired, have an inwardly protruding lip that helps hold display 14 in place. The bottom portion of peripheral housing structures 16 may also have an enlarged lip (e.g., in the plane of the rear surface of device 10). Peripheral housing structures 16 may have substantially straight vertical sidewalls, may have sidewalls that are curved, or may have other suitable shapes. In some configurations (e.g., when peripheral housing structures 16 serve as a bezel for display 14), peripheral housing structures 16 may run around the lip of housing 12 (i.e., peripheral housing structures 16 may cover only the edge of housing 12 that surrounds display 14 and not the rest of the sidewalls of housing 12).

If desired, housing 12 may have a conductive rear surface. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a rear housing wall of device 10 may be formed from a planar metal structure and portions of peripheral housing structures 16 on the sides of housing 12 may be formed as vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions.

Display 14 may have an array of pixels that form an active area that displays images for a user of device 10. An inactive border region may run along one or more of the peripheral edges of active area if desired. Display 14 may include conductive structures such as an array of capacitive electrodes for a touch sensor, conductive lines for addressing pixels, driver circuits, etc.

Housing 12 may include internal conductive structures such as metal frame members and a planar conductive housing member (sometimes referred to as a midplate) that spans the walls of housing 12 (i.e., a substantially rectangular sheet formed from one or more parts that is welded or otherwise connected between opposing sides of member 16 or other sheet metal parts that provide housing 12 with structural support). Device 10 may also include conductive structures such as printed circuit boards, components mounted on printed circuit boards, and other internal conductive structures. These conductive structures, which may be used in forming a ground plane in device 10, may be located in the center of housing 12, may extend under inactive or active areas display 14, etc.

In regions 22 and 20, openings may be formed within the conductive structures of device 10 (e.g., between peripheral conductive housing structures 16 and opposing conductive ground structures such as conductive housing midplate or rear housing wall structures, a printed circuit board, and conductive electrical components in display 14 and device 10). These openings, which may sometimes be referred to as gaps, may be filled with air, plastic, and other dielectrics and may be used in forming slot antenna resonating elements for one or more antennas in device 10.

Conductive housing structures and other conductive structures in device 10 such as a midplate, traces on a printed circuit board, display 14, and conductive electronic components may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired, the ground plane that is under display 14 and/or other metal structures in device 10 may have portions that extend into parts of the ends of device 10 (e.g., the ground may extend towards the dielectric-filled openings in regions 20 and 22), thereby narrowing the slots in regions 20 and 22. In configurations for device 10 with narrow U-shaped openings or other openings that run along the edges of device 10, the ground plane of device 10 can be enlarged to accommodate additional electrical components (integrated circuits, sensors, etc.)

In general, device 10 may include any suitable number of antennas (e.g., one or more, two or more, three or more, four or more, etc.). The antennas in device 10 may be located at opposing first and second ends of an elongated device housing (e.g., at ends 20 and 22 of device 10 of FIG. 1), along one or more edges of a device housing, in the center of a device housing, in other suitable locations, or in one or more of these locations. The arrangement of FIG. 1 is merely illustrative.

Portions of peripheral housing structures 16 may be provided with peripheral gap structures. For example, peripheral conductive housing structures 16 may be provided with one or more gaps such as gaps 18, as shown in FIG. 1. The gaps in peripheral housing structures 16 may be filled with dielectric such as polymer, ceramic, glass, air, other dielectric materials, or combinations of these materials. Gaps 18 may divide peripheral housing structures 16 into one or more peripheral conductive segments. There may be, for example, two peripheral conductive segments in peripheral housing structures 16 (e.g., in an arrangement with two of gaps 18), three peripheral conductive segments (e.g., in an arrangement with three of gaps 18), four peripheral conductive segments (e.g., in an arrangement with four gaps 18, etc.). The segments of peripheral conductive housing structures 16 that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral housing structures 16 and may form antenna slots, gaps 18, and other structures in device 10. Polymer or other dielectric may fill these grooves and other housing openings. In some situations, housing openings that form antenna slots and other structure may be filled with a dielectric such as air.

In a typical scenario, device 10 may have upper and lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
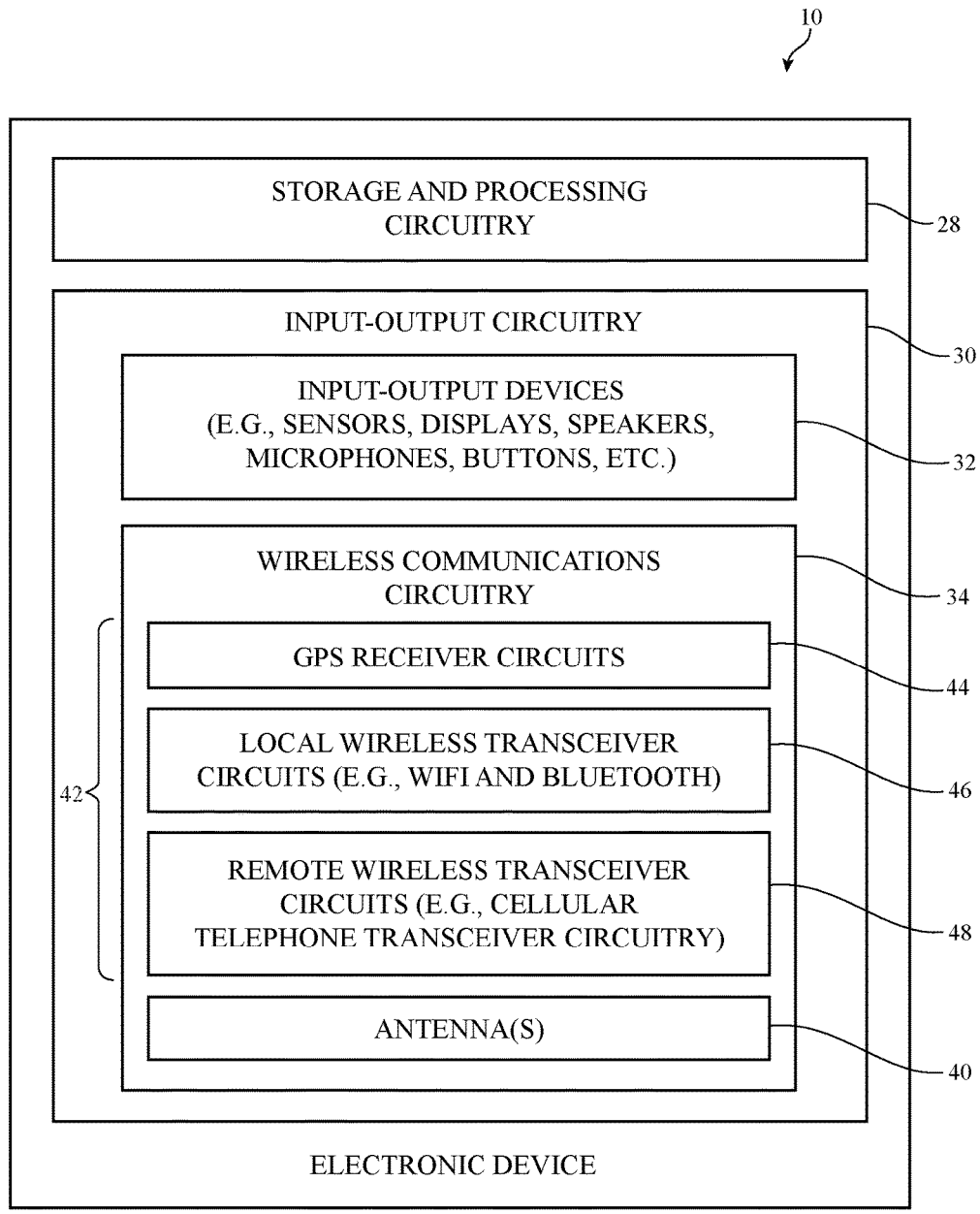
FIG. 2 is a schematic diagram of illustrative circuitry in an electronic device in accordance with an embodiment.

A schematic diagram showing illustrative components that may be used in device 10 of FIG. 1 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, multiple-input and multiple-output (MIMO) protocols, antenna diversity protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, fingerprint sensors (e.g., a fingerprint sensor integrated with a button such as button 24 of FIG. 1 or a fingerprint sensor that takes the place of button 24), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 42 for handling various radio-frequency communications bands. For example, circuitry 34 may include transceiver circuitry 44, 46, and 48. Transceiver circuitry 46 may handle 2.4 GHz and 5 GHz bands for WiFi® (IEEE 802.11) communications or other wireless local area network (WLAN) bands and may handle the 2.4 GHz Bluetooth® communications band or other wireless personal area network (WPAN) bands. Circuitry 34 may use cellular telephone transceiver circuitry 48 for handling wireless communications in frequency ranges such as a low communications band from 600 to 960 MHz, a low midband from 1400-1520 MHz, a midband from 1710 to 2170 MHz, and a high band from 2300 to 2700 MHz or other communications bands between 600 MHz and 4000 MHz or other suitable frequencies (as examples). Circuitry 48 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include global positioning system (GPS) receiver equipment such as GPS receiver circuitry 44 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, monopole antenna structures, dipole antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Figure 3:
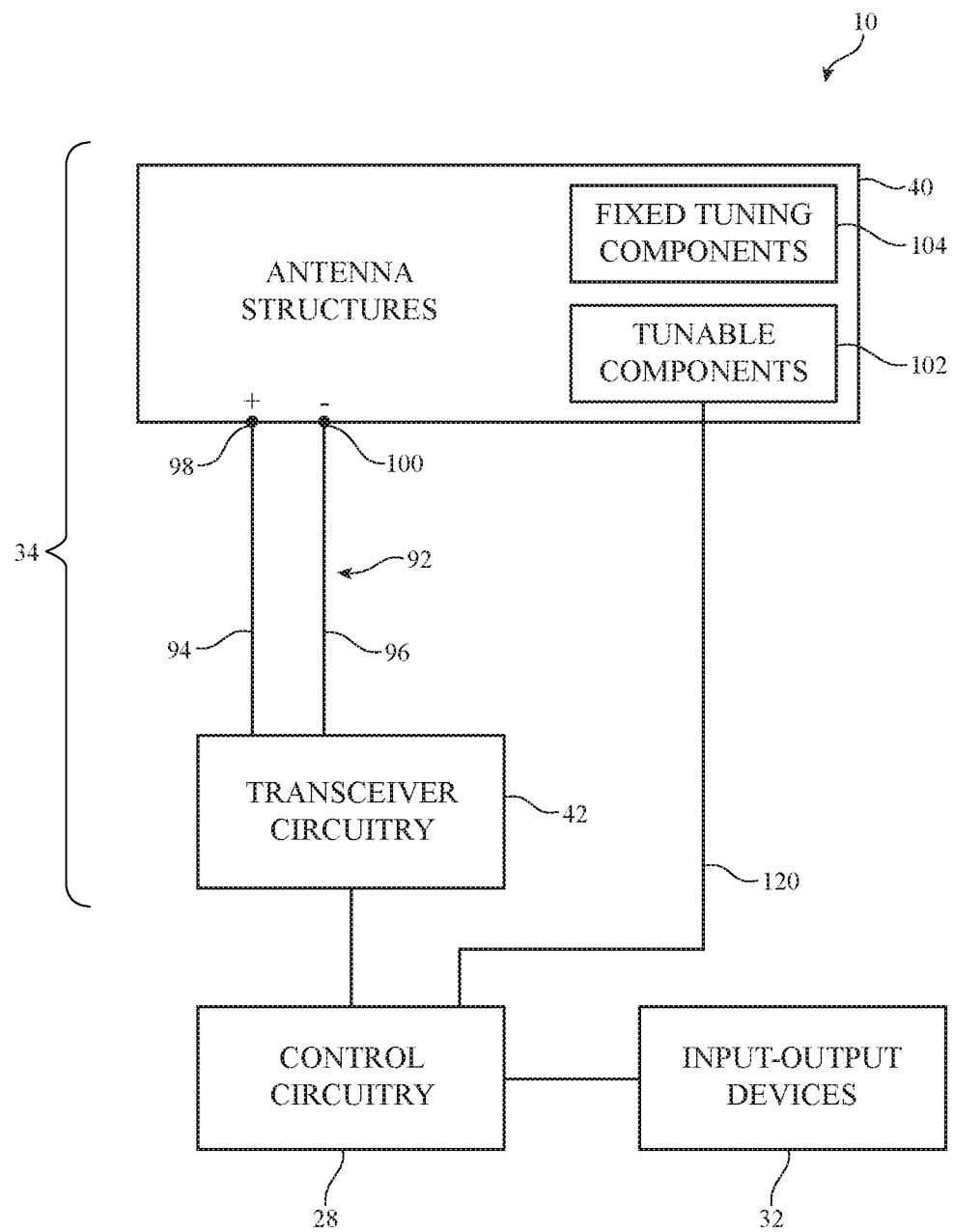
FIG. 3 is a schematic diagram of illustrative wireless circuitry in accordance with an embodiment.

As shown in FIG. 3, transceiver circuitry 42 in wireless circuitry 34 may be coupled to antenna structures 40 using paths such as path 92. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures such as antenna(s) 40 with the ability to cover communications frequencies of interest, antenna(s) 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) 40 may be provided with adjustable circuits such as tunable components 102 to tune antennas over communications bands of interest. Tunable components 102 may be part of a tunable filter or tunable impedance matching network, may be part of an antenna resonating element, may span a gap between an antenna resonating element and antenna ground, etc. Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 120 that adjust inductance values, capacitance values, or other parameters associated with tunable components 102, thereby tuning antenna structures 40 to cover desired communications bands.

If desired, antenna 40 may be provided with fixed components such as fixed tuning components 104. Fixed tuning components 104 may be part of a passive filter or fixed impedance matching network, may be part of an antenna resonating element, may span a gap between an antenna resonating element and antenna ground, etc. Fixed tuning components 104 may include one or more fixed inductors (e.g., components that exhibit a predetermined inductance), one or more fixed capacitors (e.g., components that exhibit a predetermined capacitance), or other electronic components. Fixed tuning components 104 may include distributed metal structures that produce associated distributed capacitances and inductances or discrete components such as surface mount inductors and surface mount capacitors. The capacitances and inductances of fixed tuning components 104 may be fixed and un-adjustable (e.g., set during design, manufacture, calibration, or testing of device 10 prior to use by an end user). Fixed tuning components 104 may be coupled to antenna structures 40 to tune the frequency response of antenna structures 40 (e.g., so that antenna structures 40 cover one or more desired frequency bands of interest with sufficient antenna efficiency).

Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable, a stripline transmission line, or a microstrip transmission line (as examples). A matching network formed from components such as fixed or tunable inductors, resistors, and capacitors may be used in matching the impedance of antenna(s) 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components (e.g., tunable components 102 and fixed components 104).

Transmission line 92 may be coupled to antenna feed structures associated with antenna structures 40. As an example, antenna structures 40 may form an inverted-F antenna, a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 92. Other types of antenna feed arrangements may be used if desired. For example, antenna structures 40 may be fed using multiple feeds. The illustrative feeding configuration of FIG. 3 is merely illustrative.

Figure 4:
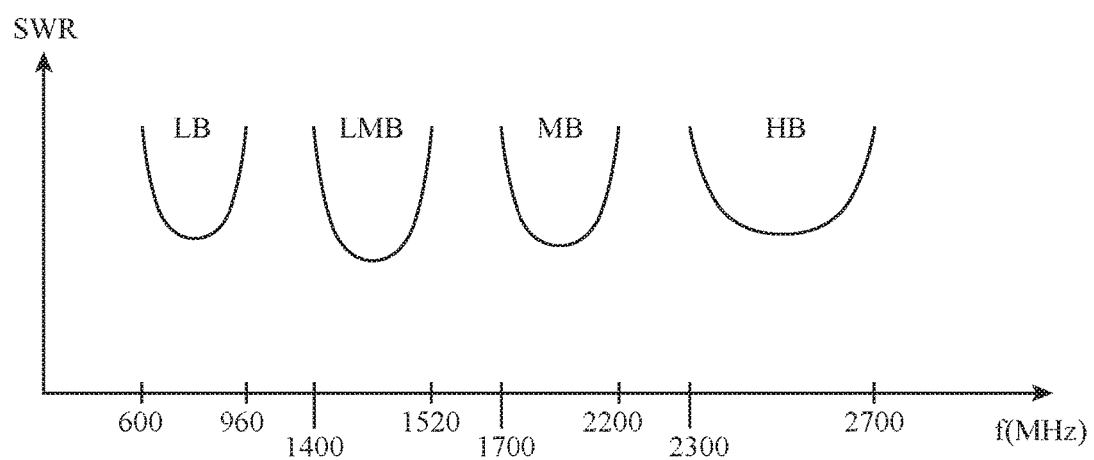
FIG. 4 is a graph in which illustrative antenna performance (standing-wave ratio) has been plotted as a function of operating frequency in accordance with an embodiment.

Antenna structures 40 may include resonating element structures, antenna ground plane structures, an antenna feed, and other components (e.g., tunable components 102 and tuning components 104). Antenna structures 40 may be configured to form any suitable types of antenna. With one suitable arrangement, which is sometimes described herein as an example, antenna structures 40 are used to implement a hybrid inverted-F-slot antenna that includes both inverted-F and slot antenna resonating elements. A graph of antenna performance (standing wave ratio SWR) as a function of operating frequency for an illustrative hybrid antenna is shown in FIG. 4. As shown in FIG. 4, the hybrid antenna may exhibit resonances in multiple communications bands such as a low band LB from 600-960 MHz, a low-midband LMB from 1400-1520 MHz, a midband MB from 1700-2200 MHz, and a high band HB from 2300-2700 MHz. Other frequencies (e.g., local area network frequencies in a 5 GHz band) may also be supported (e.g., using a separate monopole, etc.).

If care is not taken, the presence of conductive structures such as conductive housing structures can influence the performance of antenna 40. At the same time, the presence of conductive structures such as conductive housing structures may serve to enhance the aesthetic properties and mechanical strength device 10. If desired, one or more electronic components within device 10 may be formed from optically continuous patterned regions of conductive structures within device 10.

Figure 5:
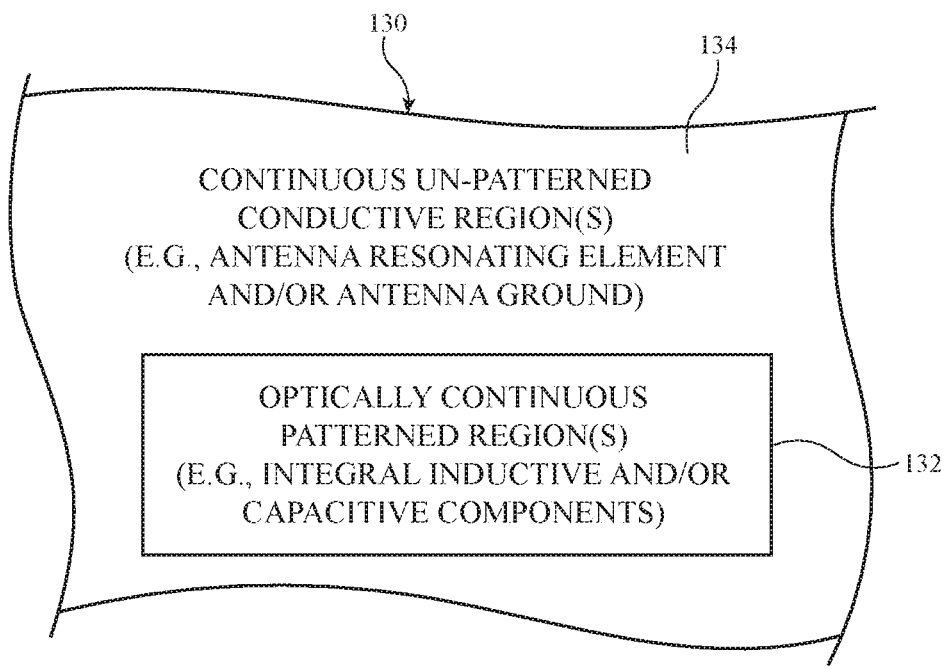
FIG. 5 is a diagram showing how electronic components such as antenna tuning components may be formed from an optically continuous patterned region of a conductive layer in accordance with an embodiment.

FIG. 5 is a diagram showing how electronic components may be formed from conductive structures within device 10. As shown in FIG. 5, electronic device 10 may include conductive structures such as conductive layer 130. If desired, conductive layer 130 may be formed on a dielectric substrate. Conductive layer 130 may include a metal trace, metal foil, stamped sheet metal, a conductive coating on a dielectric substrate, a conductive portion of housing 12 (e.g., peripheral conductive housing structures 16 of FIG. 1), or any other desired conductive structure. Conductive layer 130 may have a planar shape, may be located within a non-planar or curved surface, or may have other shapes. Conductive layer 130 may include, for example, copper, aluminum, stainless steel, silver, gold, nickel, tin, other metals or metal alloys, or any other desired conductive materials.

Conductive layer 130 may be patterned to form an optically continuous pattern region such as region 132 and a continuous region such as region 134. At least two slots or openings may be formed in conductive layer 130 within region 132. The slots in region 132 may be arranged in a grid pattern or may divide the conductive material within layer 130 into one or more conductive segments, as examples. If desired, the slots in region 132 may divide the conductive material in layer 130 into a conductive path having a predetermined electrical path length within region 132. Continuous region 134 may be formed from a single continuous portion of conductive layer 130 (e.g., region 134 may be formed from a solid portion of conductive layer 130 that is free from slots or openings). Region 134 may sometimes be referred to herein as un-patterned region 134, solid region 134, or continuous region 134, whereas region 132 is sometimes referred to herein as patterned region 132. Regions 134 and 132 may sometimes be referred to herein as portions of conductive layer 130.

Un-patterned region 134 may surround some or all of patterned region 132 (e.g., at least one edge or at least part of the outline of patterned region 132 may be defined by un-patterned region 134). For example, the edges of conductive material in un-patterned region 134 may define the edges of one or more slots within patterned region 132. If desired, layer 130 may include multiple un-patterned regions 134 that define one or more edges (e.g., one or more sides) of patterned region 132 (e.g., two continuous regions 134 may define opposing edges or sides of a corresponding patterned region 132). In one suitable arrangement, patterned region 132 may have first and second opposing edges that are defined by two un-patterned regions 134 and third and fourth opposing edges that are not surrounded by any part of layer 130 and that extend between the first and second edges.

If desired, patterned regions 132 may be used to form one or more electronic components for device 10. The dimensions, shapes, and arrangement of the slots within patterned region 132 may configure region 132 to exhibit desired electrical properties (e.g., inductive and/or capacitive properties). For example, patterned region 132 may exhibit a predetermined capacitance to form a capacitor or may exhibit a predetermined inductance to form an inductor within (e.g., integral with) conductive layer 130. The inductance and/or capacitance of patterned region 132 may be tuned (e.g., through the configuration of the corresponding slots) to form a short circuit across region 132 and/or an open circuit across region 132 at predetermined radio-frequencies. If desired, electronic components such as antenna tuning components 102 and/or 104 for antenna 40 (FIG. 3) may be formed using one or more patterned regions 132 of one or more conductive layers 130.

If desired, un-patterned regions 134 may be used to form portions of one or more antennas 40 in device 10. For example, one or more un-patterned regions 134 of one or more conductive layers 130 may be used to form antenna resonating elements and/or antenna ground structures for one or more antennas 40 in device 10.

The dimensions, shape, and arrangement of the slots within patterned region 132 of conductive layer 130 may, if desired, be selected so that the slots are substantially invisible or indiscernible to the unaided human eye. For example, the slots may be narrower than is resolvable to the unaided human eye at a predetermined distance from conductive layer 130 (e.g., a distance of 1 meter, 1 centimeter, 10 centimeters, etc.). This may allow the entirety of patterned region 132 and un-patterned region 134 to appear to a user as a single continuous (solid) piece of metal, thereby obscuring the potentially unsightly slots within region 132 from the user's view. This may serve to enhance the aesthetic properties of conductive layer 130 to the user (particularly in scenarios where conductive layer 130 is formed at the exterior of device 10 such as when conductive layer 130 is formed from a portion of device housing 12, for example).

As an example, the optical characteristics of regions 132 and 134 of conductive layer 130 may be characterized by the reflectivity, absorption, and transmission of visible light by regions 132 and 134. Region 132 may exhibit a first reflectivity, first absorptivity, and first transmissivity, whereas region 134 exhibits a second reflectivity, second absorptivity, and second transmissivity for visible light. In order to appear to the unaided eye as a single continuous piece of conductor, region 132 have a first reflectivity, first absorptivity, and/or first transmissivity that are within a predetermined margin of the second reflectivity, second absorptivity, and/or second transmissivity associated with region 134, respectively (e.g., within a margin of 10%, 20%, 10-20%, 20-30%, 5%, 2%, 1-10%, etc.).

The example of FIG. 5 is merely illustrative. If desired, multiple patterned regions 132 may be formed at different locations within conductive layer 130. Each of the patterned regions in conductive layer 130 may be separated by some or all of un-patterned region 134. Device 10 may include multiple conductive layers 130 having patterned regions 132. Two or more edges (sides) of each region 132 may be defined by one or more un-patterned regions 134 of one or more conductive layers 130.

Figure 6:
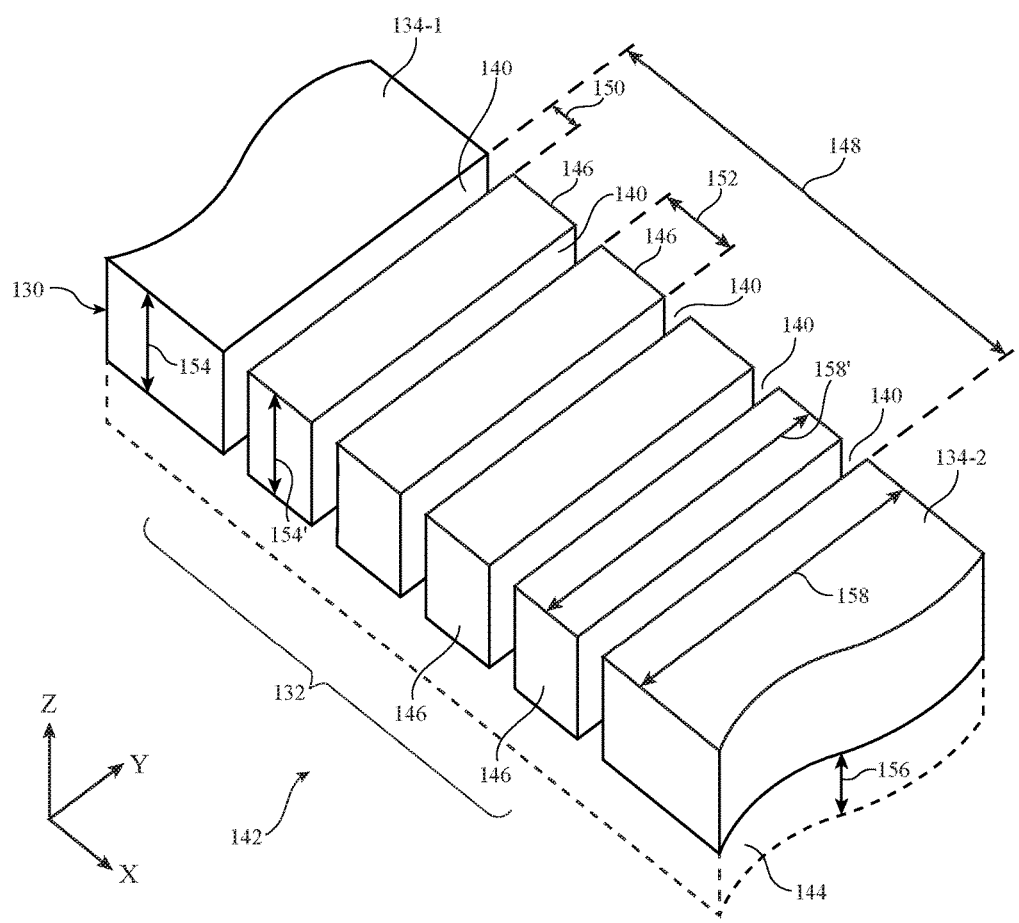
FIG. 6 is a perspective view of an antenna tuning capacitor formed from an optically continuous patterned region of a conductive layer in accordance with an embodiment.

FIG. 6 is a perspective view showing how a capacitive antenna tuning component (e.g., an antenna tuning capacitor) may be formed from a given patterned region 132 of conductive layer 130. As shown in FIG. 6, conductive layer 130 may be formed on a substrate such as dielectric substrate 144. Substrate 144 may be formed from plastic, polymer, glass, ceramic, epoxy, foam, a rigid or flexible printed circuit board substrate, or any other desired materials. Conductive layer 130 may include a conductive coating or metal coating, sheet metal, conductive or metal traces, or any other desired conductive structures formed on a surface of substrate 144. Substrate 144 may have a thickness (height) 156. Conductive layer 130 may have a thickness (height) 154 within un-patterned regions 134 and a thickness 154' within patterned region 132. Thickness 154' may be less than, equal to, or greater than thickness 154. Thickness 156 of substrate 144 may be, for example, between 1 mm and 6 mm, between 2 mm and 5.5 mm, between 3 mm and 5 mm, less than 1 mm, between 0.1 mm and 2 mm, or greater than 6 mm (e.g., 1 cm, 5 cm, 10 cm, etc.). Thicknesses 154 and 154' of conductive layer 130 may be, for example, between 100 nm and 10 nm, between 75 nm and 25 nm, less than 25 nm, greater than 100 nm, between 0.1 mm and 0.5 mm, between 500 microns and 1 mm, between 1 and 500 microns, between 100 microns and 300 microns (e.g., within 15% of 200 microns), between 100 microns and 5 mm, or greater than 1 mm. Substrate 144 may be omitted if desired.

As shown in FIG. 6, a set of slots such as slots 140 may be formed in conductive layer 130 within patterned region 132. As examples, slots 140 may be formed in conductive layer 130 by etching (e.g., laser etching), stripping, cutting, or otherwise removing conductive material in layer 130 from the surface of substrate 144, or may be formed upon deposition of conductive layer 130 onto the surface of substrate 144. Slots 140 (sometimes referred to as gaps, notches, or openings) may extend through thickness 154' of region 132, thereby exposing substrate 144 (or other structures under layer 130) through layer 130. If desired, slots 140 may be filled with a dielectric material such as plastic, glass, ceramic, epoxy, adhesive, integral portions of substrate 144, or other dielectric materials. If desired, slots 140 may be filled with air. In another suitable arrangement, slots 140 may be formed from integral portions of conductive layer 130 that have been processed to no longer be conductive (e.g., using oxidation or other processing techniques). In yet another suitable arrangement, slots 140 may extend only partially through the thickness 154' of region 132 (e.g., some of the conductive material in layer 130 may remain within slots 140 if desired).

In the example of FIG. 6, slots 140 have a rectangular shape and are formed in a pattern that divides conductive layer 130 within patterned region 132 into multiple rectangular conductive patches 146 (e.g., a one-dimensional array of patches 146 each having edges defined by slots 140). Each of the rectangular patches 146 in patterned region 132 may be separated from other rectangular patches 146 and/or from un-patterned portions 134 of layer 130 by a corresponding slot 140. The edges of patterned region 132 may be defined by the edges of at least two slots 140. For example, a first slot 140 may separate conductive patches 146 in region 132 from a first un-patterned region 134-1 whereas a second slot 140 separates conductive patches 146 in region 132 from a second un-patterned region 134-2 of layer 130. Conductive patches 146 may sometimes be referred to herein as conductive segments or conductive tiles.

Patterned region 132 may have a width 148 (e.g., extending from the edges of the two slots 140 defining region 132 and along the X-axis of FIG. 6). Each conductive patch 146 may have a longitudinal length 158' (e.g., length 158' may be the length of the longest side of each patch 146) and a perpendicular width 152. Un-patterned regions 134-1 and 134-2 may have a length 158 (e.g., along the Y-axis). In the example of FIG. 6, length 158' of patches 146 is equal to the length 158 of un-patterned regions 134-1 and 134-2. However, this is merely illustrative. If desired, length 158' may be less than width 158 or greater than width 158. Regions 134-1 and 134-2 may have the same length 158 or may have different lengths. In scenarios where length 158' is less than length 158, additional slots 140 may extend along the X-axis from region 134-1 to region 134-2 at one or both ends of the longitudinal length of patches 146. In another suitable arrangement, region 132 may be formed within a single un-patterned region 134 having continuous conductive portions that extend across width 148 of region 132 (e.g., at one or both of the ends of the longitudinal length of patches 146). In the example of FIG. 6, the edges of region 132 that are not defined by regions 134-1 and 134-2 also form edges of layer 130 itself (e.g., two of the edges of region 132 may be defined by air, dielectric, or other structures that are not a part of conductive layer 130).

Each slot 140 may have a longitudinal length (e.g., along the Y-axis) and a corresponding perpendicular width 150. The longitudinal length of slots 140 may be less than, equal to, or greater than longitudinal length 158' of patches 146 and/or width 158 of un-patterned regions 134-1 and 134-2. Each rectangular patch 146 in region 132 may have the same size and dimensions or two or more patches 146 may have different sizes or dimensions. Each slot 140 in region 132 may have the same length and width or two or more slots 140 may have different lengths and/or widths.

The presence of patches 146 within region 132 may serve to decrease the capacitance between un-patterned regions 134-1 and 134-2 (relative to scenarios where no conductive material is formed between regions 134-1 and 134-2). For example, each patch 146 may effectively serve as a capacitor electrode (e.g., a capacitor plate) in a capacitor formed with the adjacent patches 146 and/or regions 134-1 and 134-2. Taken collectively, patches 146 may effectively serve as a set of capacitors coupled in series between regions 134-1 and 134-2. The corresponding capacitance of region 132 between regions 134-1 and 134-2 may be given by the series-added capacitances associated with each pair of patches 146 and/or associated with the outer-most patches 146 and regions 134-1 and 134-2. This may serve to reduce the capacitance between regions 134-1 and 134-1 relative to scenarios where no patches 146 are formed in region 132. The number of patches 146 and slots 140 within region 132 as well as dimensions 150, 152, and 158' may be selected so that region 132 provides a desired capacitance across width 148 (e.g., between a first capacitor terminal formed by region 134-1 and a second capacitor terminal formed by region 134-2 of conductive layer 130). In this way, slots 140 and patches 146 may effectively form a capacitor 142 embedded or integrated within conductive layer 130 having a predetermined capacitance.

At the same time, width 150 of slots 140 may be selected to adjust the visibility of slots 140 to the un-aided eye of a user of device 10. In order for slots 140 to remain invisible or indiscernible to the un-aided human eye at a predetermined distance (e.g., for region 132 to appear as a continuous piece of conductor), slots 140 may have a width 150 that is less than or equal to the resolving power of the un-aided human eye at the predetermined distance (e.g., less than 200 microns). In general, given a fixed width 148 of region 132 (e.g., as determined by design requirements for device 10), width 150 may be selected to balance the desired capacitance across region 132 with the visibility of slots 140. As examples, slots 140 may have widths 150 that are less than 200 microns or less than 100 microns such as a width of 50 microns, 40 microns, 70 microns, between 50 and 70 microns, between 70 and 100 microns, between 20 and 50 microns, between 2 and 5 microns, between 10 and 20 microns, between 1 and 10 microns, less than 1 micron, etc.

Patches 146 may have widths 152 that are equal to, less than, or greater to width 150 of slots 140. As examples, width 152 may be between 20 microns and 30 microns, between 10 microns and 50 microns, between 1 micron and 100 microns, between 10 microns and 500 microns, or greater than 500 microns. Region 132 may have any desired width 148 (e.g., between 200 microns and 1 mm, between 1 mm and 3 mm, between 500 microns and 5 mm, greater than 5 mm, etc.). Regions 134 may have any desired length 158 (e.g., between 500 microns and 20 mm). In one suitable arrangement, in order to balance desired capacitance with the invisibility of slots 140 for a fixed width 148 of between 1 mm and 3 mm, width 150 of each slot 140 may be between 20 microns and 40 microns, width 152 of each patch 146 may be between 50 microns and 150 microns, there may be between seven and 23 patches 146 in region 132, there may be between nine and 25 slots 140 in region 132, and thickness 154' of region 132 may be between 150 microns and 250 microns, and thickness 154 of region 132 may be between 500 microns and 10 mm, for example.

When configured in this way, patterned region 132 of conductive layer 130 may exhibit a desired (predetermined) capacitance while also exhibiting a visible light reflectivity, absorptivity, and/or transmissivity that are within 20%, within 10%, within less than 10% (e.g., within 5%, within 2%, etc.), or within 10-20% of the visible light reflectivity, absorptivity, and/or transmissivity of un-patterned regions 134 of conductive layer 130, as examples. Patterned region 132 and un-patterned regions 134 of conductive layer 130 may thereby appear to the user of device 10 as a single continuous piece of metal despite there being an integrated capacitor 142 formed therein.

If desired, an optional protective cover layer may be formed over conductive layer 130 (e.g., on a side of layer 130 opposite to substrate 144). The protective layer may include, for example, a dielectric or polymer coating, and may mechanically protect layer 130 from damage or contaminants. If desired, the optional cover layer and/or substrate 144 may be omitted. In this scenario, dielectric adhesive may be formed within slots 140 to bind patches 146 together and to regions 134 of layer 130, for example.

The example of FIG. 6 is merely illustrative. In general, any desired number of slots 140 and patches 146 may be formed within region 132 (e.g., one patch 146 and two slots 140, two patches 146 and three slots 140, three patches 146, between three patches 146 and twelve patches 146, more than twelve patches 146, between two and thirteen slots 140, more than thirteen slots 140, etc.). Patches 146 may have any desired shape (e.g., a triangular shape, a square shape, an elliptical shape, a hexagonal shape or other polygonal shape, a circular shape, shapes having curved and/or straight edges, etc.). In scenarios where patches 146 are non-rectangular, width 158 may be equal to the longest side of patch 146, the maximum lateral dimension of patch 146, the length of a side of a rectangular footprint of patch 146, etc. Similarly, slots 140 may have any desired shape (e.g., shapes having any desired combination of curved and/or straight edges). If desired, substrate 144 may be formed under region 132 and omitted under regions 134 or other substrates may be formed under regions 134. Conductive layer 130 may sometimes be referred to herein as conductive structures 130.

Figure 7:
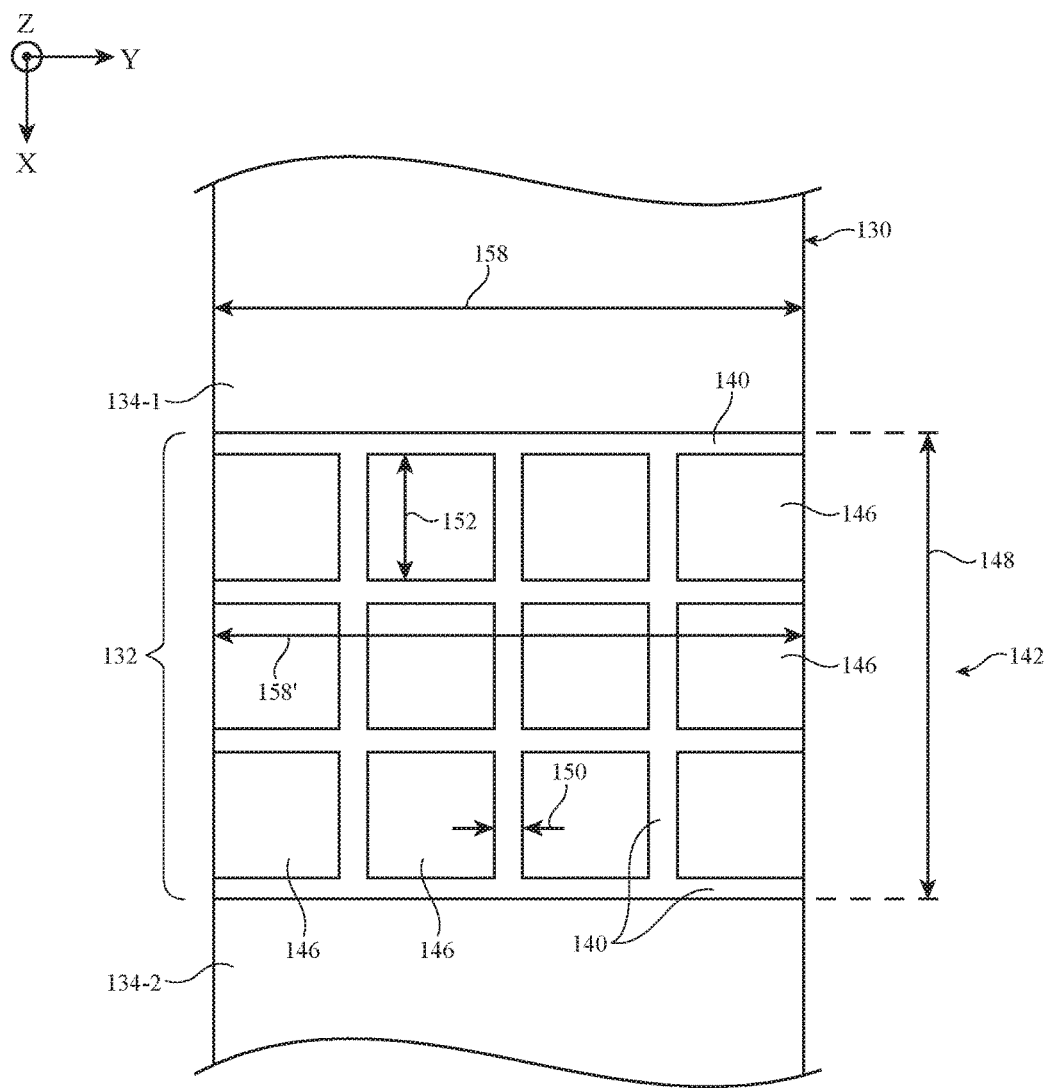
FIG. 7 is a top-down view of an antenna tuning capacitor formed from an array of conductive patches within an optically continuous patterned region of a conductive layer in accordance with an embodiment.

If desired, slots 140 may be arranged in a grid pattern in conductive layer 130. FIG. 7 is a top-down view of conductive layer 130 showing how a grid of slots 140 may be formed in conductive layer 130. As shown in FIG. 7, a grid of slots 140 may be formed in conductive layer 130 within patterned region 132. Slots 140 may be formed in a rectangular grid pattern in which slots 140 divide conductive layer 130 into multiple rectangular conductive patches 146 (e.g., the edges of conductive patches 146 may be defined by slots 140). If desired, conductive patches 146 may be arranged in a two-dimensional array having aligned rows and columns. In another suitable arrangement, the rows and/or columns of patches 146 in the two-dimensional array may be misaligned (e.g., the even numbered rows or columns of patches 146 may all be aligned with each other whereas the odd numbered rows or columns of patches 146 are all aligned with each other but misaligned with respect to the even numbered rows and columns). Each of the rectangular patches 146 in patterned region 132 may be separated from other rectangular patches 146 and/or from un-patterned portions 134 of layer 130 by a corresponding segment of slots 140.

Each column of patches 146 may serve as a set of series connected capacitors coupled between conductive region 134-1 and conductive region 134-2. Collectively, the columns of patches 146 may serve as (series) capacitors that are coupled in parallel between conductive regions 134-1 and 134-2. The dimensions, arrangement, and number of slots 140 and patches 146 may be selected so that region 132 exhibits a desired capacitance from region 134-1 to region 134-2 (e.g., so that region 132 forms capacitor 142 embedded or integrated within conductive layer 130 having a desired capacitance). The width 150 of slots 140 may be sufficiently narrow so as to remain invisible or indiscernible to the un-aided human eye at a predetermined distance (e.g., so that regions 134-1, 134-2, and 132 appear as a continuous piece of conductor). Arranging slots 140 in a grid pattern and patches 146 in a two-dimensional array in this way may serve to increase the optical continuity of regions 134-1, 132, and 134-2 to the un-aided human eye while also increasing the overall capacitance of region 132 relative to scenarios where patches 146 are arranged in a one-dimensional array and divided by a set of parallel slots 140 as shown in FIG. 6, for example.

The example of FIG. 7 in which a grid of slots 140 divide conductive layer 130 into an array of rectangular patches 146 is merely illustrative. If desired, slots 140 may divide conductive layer 130 into an array of conductive patches of any desired shape. For example, a grid of slots 140 may divide layer 130 within region 132 into an array of hexagonal patches, triangular patches, pentagonal patches, rounded patches such as circular or elliptical patches, octagonal patches, other polygonal patches, patches having curved and/or straight edges, combinations of these, etc. Different sets of conductive patches 146 of different sizes, shapes, and dimensions may be formed within the same patterned region 132 if desired. Each slot 140 in region 132 may have the same width 150 or two or more slots 140 may have different widths 150 if desired.

Figure 8:
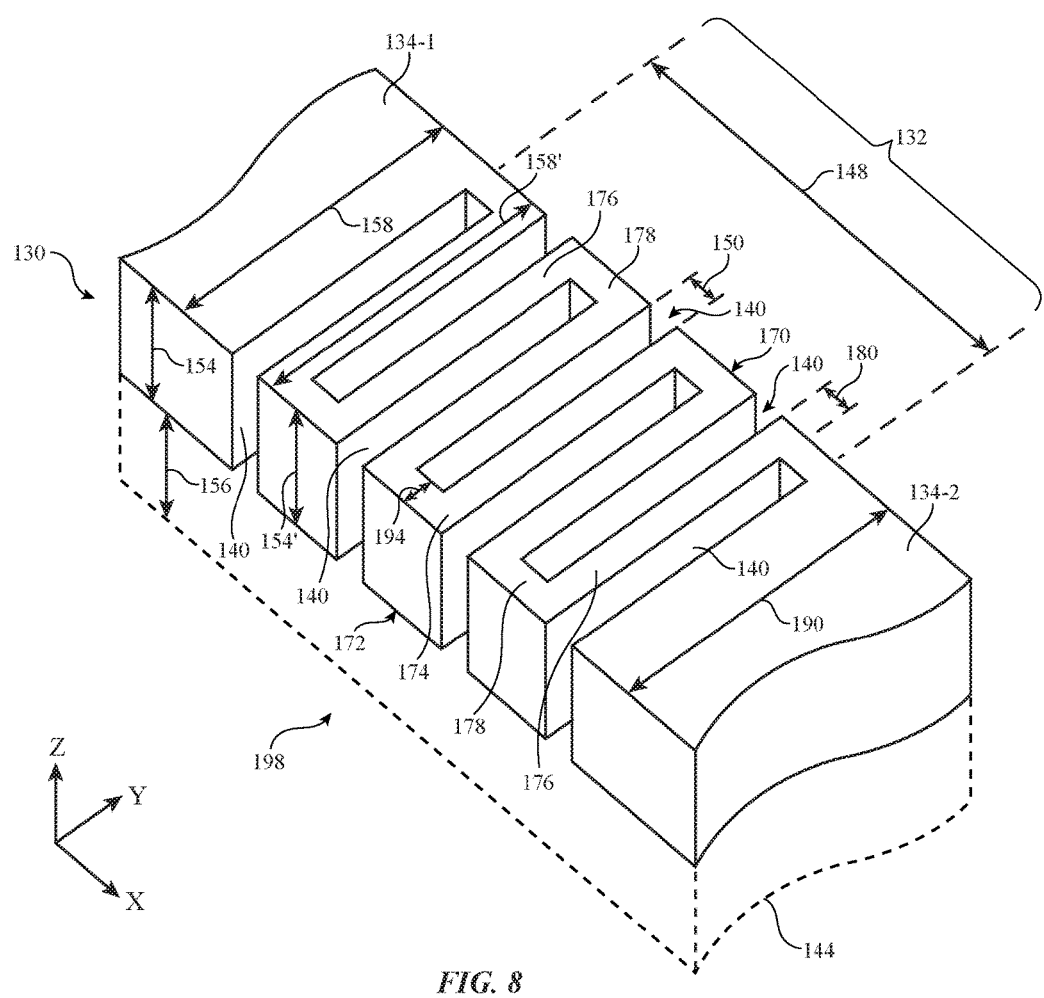
FIG. 8 is a perspective view of an antenna tuning inductor formed from an optically continuous patterned region of a conductive layer in an electronic device in accordance with an embodiment.

If desired, the capacitance between regions 134-1 and 134-2 may be further reduced by increasing the inductance across region 132. FIG. 8 is a perspective view showing how an inductive antenna tuning component (e.g., an antenna tuning inductor) may be formed form patterned region 132 of conductive layer 130. As shown in FIG. 8, slots 140 may divide conductive layer 130 into a meandering conductive path 174 extending from un-patterned region 134-1 to un-patterned region 134-2 within patterned region 132 (e.g., slots 140 may define the edges of conductive path 174). For example, a first set of open slots 140 (e.g., slots having three sides surrounded by conductive material in layer 130 and a fourth side that is not defined by any conductive material) may be formed in first edge 172 of conductive layer 130 whereas a second set of open slots 140 is formed in opposing second edge 170 of conductive layer 130. The slots in edge 172 may be laterally offset (e.g., in the X-Y plane) with respect to the set of slots in edge 170 so that the conductive material in region 130 follows meandering path 174. Each slot 140 may have width 150 that is sufficiently narrow so as to be invisible to the un-aided human eye (e.g., less than 200 microns such as between 20 microns and 40 microns).

The conductive material along meandering path 174 may include alternating first segments 176 extending parallel to slots 140 (e.g., along the Y-axis of FIG. 8) and second segments 178 extending perpendicular to slots 140 (e.g., along the X-axis). Segments 176 may have width 180 and longitudinal length 158'. Width 180 may, for example, be less than, greater than, or equal to width 152 of FIG. 6. In one suitable arrangement, width 180 may be between 150 microns and 250 microns. Segments 178 may have a length equal to the width 150 of slots 140 and a perpendicular width 194. Width 194 may be less than, equal to, or greater than width 180 of segments 176 (e.g., between 20 microns and 250 microns). Each slot 140 may have a longitudinal length 190 (e.g., parallel to the Y-axis) that extends across some but not all of length 158 of conductive layer 130. Length 190 may, for example, be equal to length 158' minus width 194 of segments 178.

By forming alternating slots 140 within region 132, slots 140 may increase the electrical path length between un-patterned regions 134-1 and 134-2. For example, in the absence of any slots 140, the electrical path length between regions 134-1 and 134-2 is equal to width 148 of region 132. However, in the presence of alternating slots 140, the electrical path length (e.g., the length over which currents flow between regions 134-1 and 134-2) may be equal to the sum of the lengths of each segment 178 and each segment 176 in region 132. As the inductance of a conductor is proportional to the electrical path length of the conductor, this may serve to increase the inductance between un-patterned region 134-1 and 134-2 relative to scenarios where no slots 140 are formed. In this way, meandering path 174 may form an inductor 198 integrated or embedded within layer 130. At the same time, segments 176 of inductor 198 and regions 134-1 and 134-2 may exhibit some capacitance (e.g., a self-capacitance) that can serve to tweak the impedance (e.g., frequency response) of region 132. In this way, inductor 198 may exhibit an inductance coupled in parallel with a (self) capacitance between regions 134-1 and 134-2. The number of slots 140, the dimensions 150 and 190 of slots 140, and the dimensions 158', 180, and 194 of conductive path 174 within region 132 may be selected for a given width 148 so that region 132 exhibits a desired inductance and self-capacitance between regions 134-1 and 134-2. As an example, inductor 198 may be configured to exhibit an inductance of between 10 nH and 50 nH, between 10 nH and 20 nH, between 10 nH and 100 nH, etc.

At the same time, slots 140 may be sufficiently narrow (e.g., having width 140 that is less than the width resolvable by the un-aided human eye) so that region 132 appears to a user as single continuous piece of conductor with regions 134-1 and 134-2. When configured in this way, patterned region 132 of conductive layer 130 may exhibit a desired (predetermined) inductance and (self) capacitance while also exhibiting a visible light reflectivity, absorptivity, and/or transmissivity that are within 20%, within 10%, within less than 10% (e.g., within 5%, within 2%, etc.), or within 10-20% of the visible light reflectivity, absorptivity, and/or transmissivity of un-patterned regions 134 of conductive layer 130, as examples. Patterned region 132 and un-patterned regions 134 of conductive layer 130 may thereby appear to the user of device 10 as a single continuous piece of metal despite having an integrated inductor 198 formed therein.

In one suitable arrangement, in order to balance desired inductance with the invisibility of slots 140, width 148 of region 132 is between 1 mm and 3 mm, width 150 of each slot 140 is between 20 microns and 40 microns, widths 180 and 194 of inductive path 174 are 150 microns and 250 microns, there are between three and fifteen segments 176 in conductive path 174, there are between five and sixteen slots 140 within region 132, thickness 154' of path 174 is between 150 microns and 250 microns, and thickness 154 of regions 134 is between 500 microns and 10 mm. There may be, for example, one more slot 140 than segments 176 and there may be the same number of segments 178 as slots 140 within region 132. Forming integrated inductor 198 between regions 134-1 and 134-2 may effectively reduce the capacitance between regions 134-1 and 134-2 relative to scenarios where no conductive material is formed in region 132 by a greater margin than forming integrated capacitor 142 between regions 134-1 and 134-2 (as shown in FIGS. 7 and 8), for example.

The example of FIG. 8 is merely illustrative. In general, any desired number of slots 140 and segments 176 and 178 may be formed within region 132 (e.g., three slots 140, between three and twelve slots 140, more than twelve slots 140, etc.). Each slot 140 may have the same width 150 and length 190 or two or more slots 140 may have different lengths or widths. Each segment 178 of inductive path 174 may have the same width 94 or two or more segments 178 may have different widths. Each segment 176 of inductive path 174 may have the same length 158' and width 180 or two or more segments 176 may have different lengths or widths. The edges of slots 140 (and the corresponding edges of path 174) may have any desired shape (e.g., curved and/or straight shapes). Different segments 176 may have different shapes or each segment 176 may have the same shape. Similarly, each segment 178 may have the same shape or two or more segments 178 may have different shapes. Slots 140 may extend at any desired angle with respect to other slots 140 and with respect to the edges of conductive regions 134. Similarly, segments 176 and 178 of path 174 may extend at any desired angle with respect to other segments 176 and 178 and with respect to the edges of conductive regions 134. Segments 176 need not extend perpendicularly from segments 178.

Integrated capacitor 142 as shown in FIGS. 6 and 7 and/or integrated inductor 198 as shown in FIG. 8 may be embedded within any desired conductive structures 130 within electronic device 10. For example, conductive structures 130 may include conductive traces on a printed circuit board within device 10, a metal midplate that extends across the length and/or width of device 10 for providing structural support for device 10, conductive bracket or frame components within device 10, conductive portions of other conductive components within device 10, or from external components such as portions of conductive housing 12.

Figure 9:
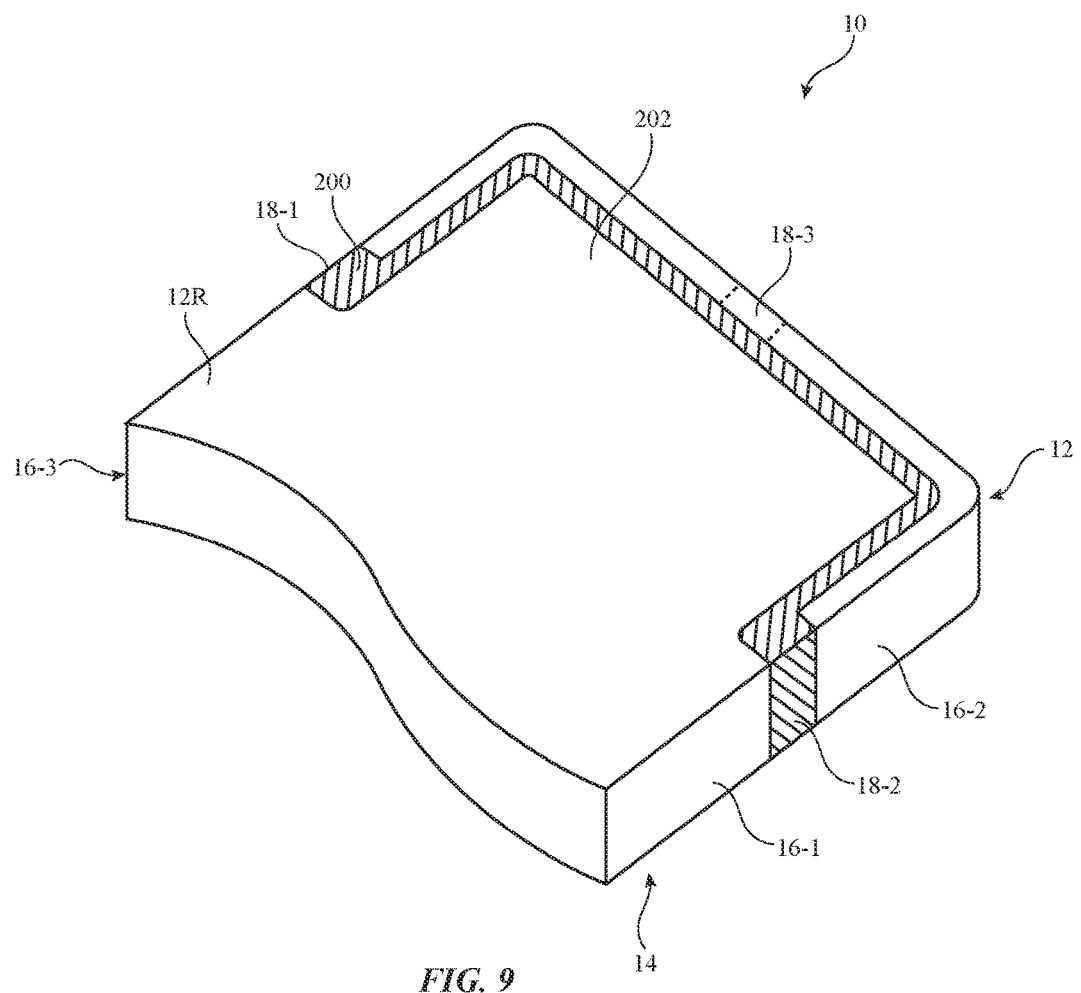
FIG. 9 is a rear perspective view of an illustrative electronic device having conductive housing walls that include optically continuous patterned regions that form antenna tuning components in accordance with an embodiment.

FIG. 9 is a perspective rear view of device 10 showing how conductive structures 130 may be formed from portions of conductive housing 12. In configurations for device 10 in which housing 12 has portions formed from metal, openings may be formed in the metal portions to accommodate antennas 40. For example, openings in a metal housing wall may be used in forming slot antenna structures and inverted-F antenna structures for cellular telephone antennas. As shown in FIG. 9, openings such as one or more dielectric gaps 18 (e.g., a first dielectric gap 18-1 and a second dielectric gap 18-2) may run up one or more conductive sidewalls 16 of housing 12. For example, dielectric gap 18-2 may divide conductive sidewall 16 into a first conductive sidewall segment (portion) 16-1 and a second conductive sidewall segment (portion) 16-2. Similarly, dielectric gap 18-1 may divide conductive sidewall 16 into a third segment (portion) 16-3. If desired, an optional dielectric gap 18-3 may divide segment 16-2 into two separate sidewall segments.

As shown in FIG. 9, an additional opening 200 may be formed at the rear of device 10 and may separate rear housing wall 12R from conductive housing sidewall segment 16-2. Rear housing wall 12R may form the rear face of device 10 and may be formed on an opposing side of device 10 from display 14. If desired, rear housing wall 12R and sidewall segments 16-1 and 16-3 may be formed from a single integrated piece of conductive material (e.g., machined metal). Opening 200 may run from dielectric gap 18-1 to dielectric gap 18-2 so that gaps 18-1, 18-2, and opening 200 form a single continuous dielectric-filled opening in the conductive housing of device 10. Openings 200 and 18 may be filled with dielectric such as plastic, epoxy, ceramic, glass, sapphire, or other dielectric materials. Opening 200 may follow the shape of housing segment 16-2 (e.g., opening 200 may have a U-shape) that defines extended portion 202 of rear wall 12R if desired. The example of FIG. 9 is merely illustrative. Openings such as opening 200 (e.g., plastic-filled openings or other dielectric filled openings) may be formed in other metal portions of housing 12 (e.g., front face housing portions on the front face of device 10, sidewall housing portions, rear wall housing portions on the rear face of device 10, etc.). Opening 200 may follow any desired path.

Openings 200 and 18 may accommodate antennas 40 within device 10. For example, openings 200 and 18 may separate resonating elements and ground plane elements for one or more antennas 40 that are formed using portions of conductive housing 12. In another suitable arrangement, openings 200 and 18 may form antenna windows for internal antennas 40 that are mounted within housing 12.

In the example of FIG. 9, rear housing wall 12R, opening 200, dielectric gaps 18, and housing sidewalls 16 all form exterior surfaces of device 10 and may thus be visible to a user of device 10. If desired, rear housing wall 12R may include a layer of metal covered by a dielectric cover layer that forms an exterior surface of device 10 (e.g., conductive wall 12R may be obscured from view by a dielectric cover layer). If desired, conductive material such as integrated inductor 198 of FIG. 8 and/or integrated capacitor 142 of FIGS. 6 and 7 may be formed within dielectric-filled gaps 18-1, 18-2, 18-3, and/or 200. The conductive material in integrated components 198 and 142 may obscure some or all of gaps 18-1, 18-2, 18-3, and/or 200 from view (e.g., so as to be invisible to the un-aided eye). In this way, sidewalls 16 and rear housing wall 12R may appear to the user as a continuous, gap-free conductor.

In these scenarios, conductive layer 130 may be formed from conductive housing wall 12R and sidewall segments 16-1, 16-2, and/or 16-3. For example, in a scenario where integrated components 198 or 142 are formed within gap 18-2, conductive layer 130 may be formed from conductive housing sidewalls 16, where un-patterned region 134-2 of FIGS. 6-8 is formed from sidewall segment 16-1, un-patterned region 134-1 is formed from sidewall segment 16-2, and conductive patches 146 (FIGS. 6 and 7) or path 174 (FIG. 8) is formed within gap 18-2. In a scenario where integrated components 198 or 142 are formed within gap 18-1, conductive layer 130 may be formed from conductive housing sidewalls 16, where un-patterned region 134-2 is formed from sidewall segment 16-2, un-patterned region 134-1 is formed from sidewall segment 16-3, and conductive patches 146 or path 174 are formed within gap 18-1. Similarly, in a scenario where integrated components 198 or 142 are formed within gap 200, conductive layer 130 may be formed from conductive housing sidewalls 16 and rear wall 12R, where un-patterned region 134-2 is formed from rear wall 12R, un-patterned region 134-1 is formed from sidewall segment 16-2, and conductive patches 146 or path 174 are formed within gap 200.

In scenarios where conductive portions of housing 12 are used to form portions of one or more antennas 40, integrated antenna tuning components 142 and 198 may be used to adjust the radio-frequency performance of antennas 40 in one or more frequency bands (e.g., tuning components 142 and 198 may form fixed tuning components 104 of FIG. 3). At the same time, integrated antenna tuning components 142 and 198 may serve to obscure the presence of gaps 18-1, 18-2, 18-3, and 200 from view of a user.

Figure 10:
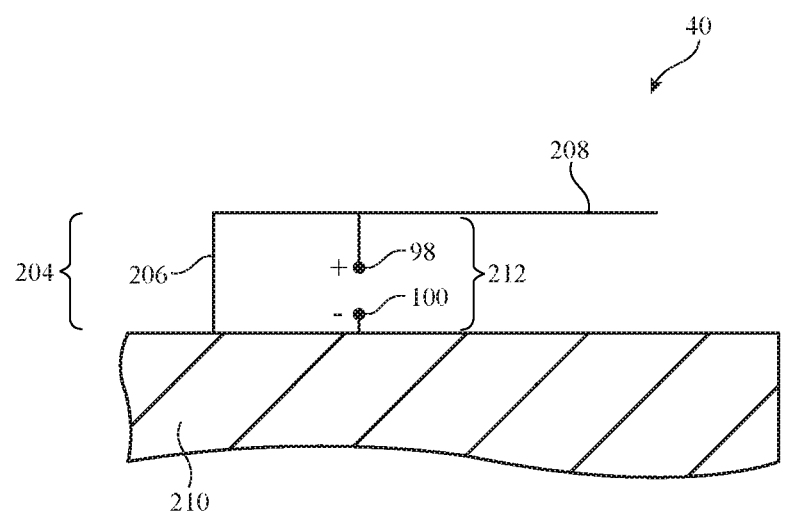
FIG. 10 is a schematic diagram of an illustrative inverted-F antenna in accordance with an embodiment.

Antenna 40 may be formed using any desired antenna type. For example, antenna 40 may include an antenna with a resonating element that is formed from loop antenna structures, patch antenna structures, inverted-F antenna structures, slot antenna structures, planar inverted-F antenna structures, helical antenna structures, monopole antenna structures, dipole antenna structures, hybrids of these designs, etc. FIG. 10 is a diagram of illustrative inverted-F antenna structures that may be used in implementing antenna 40 for device 10.

As shown in FIG. 10, antenna 40 may include inverted-F antenna resonating element 204 and antenna ground (ground plane) 210. Antenna resonating element 204 may have a main resonating element arm such as arm 208. The length of arm 208 and/or portions of arm 208 may be selected so that antenna 40 resonates at desired operating frequencies. For example, the length of arm 208 may be a quarter of a wavelength at a desired operating frequency for antenna 40. Antenna 40 may also exhibit resonances at harmonic frequencies.

Main resonating element arm 208 may be coupled to ground 210 by return path 206. An inductor or other component may be interposed in path 206 and/or tunable components 102 and 104 may be interposed in path 206. If desired, tunable components 102 and/or 104 may be coupled in parallel with path 206 between arm 208 and ground 210. For example, integrated capacitor 142 of FIGS. 6 and 7 and/or integrated inductor 198 of FIG. 8 may be coupled between arm 208 and ground 210 in parallel with path 206. Additional return paths 206 may be coupled between arm 208 and ground 210 if desired.

Antenna 40 may be fed using one or more antenna feeds. For example, antenna 40 may be fed using antenna feed 212. Antenna feed 212 may include positive antenna feed terminal 98 and ground antenna feed terminal 100 and may run in parallel to return path 206 between arm 208 and ground 210. If desired, inverted-F antennas such as illustrative antenna 40 of FIG. 10 may have more than one resonating arm branch (e.g., to create multiple frequency resonances to support operations in multiple communications bands) or may have other antenna structures (e.g., parasitic antenna resonating elements, tunable components to support antenna tuning, etc.). For example, arm 208 may have left and right branches that extend outwardly from feed 212 and return path 206. Multiple feeds may be used to feed antennas such as antenna 40.

Figure 11:
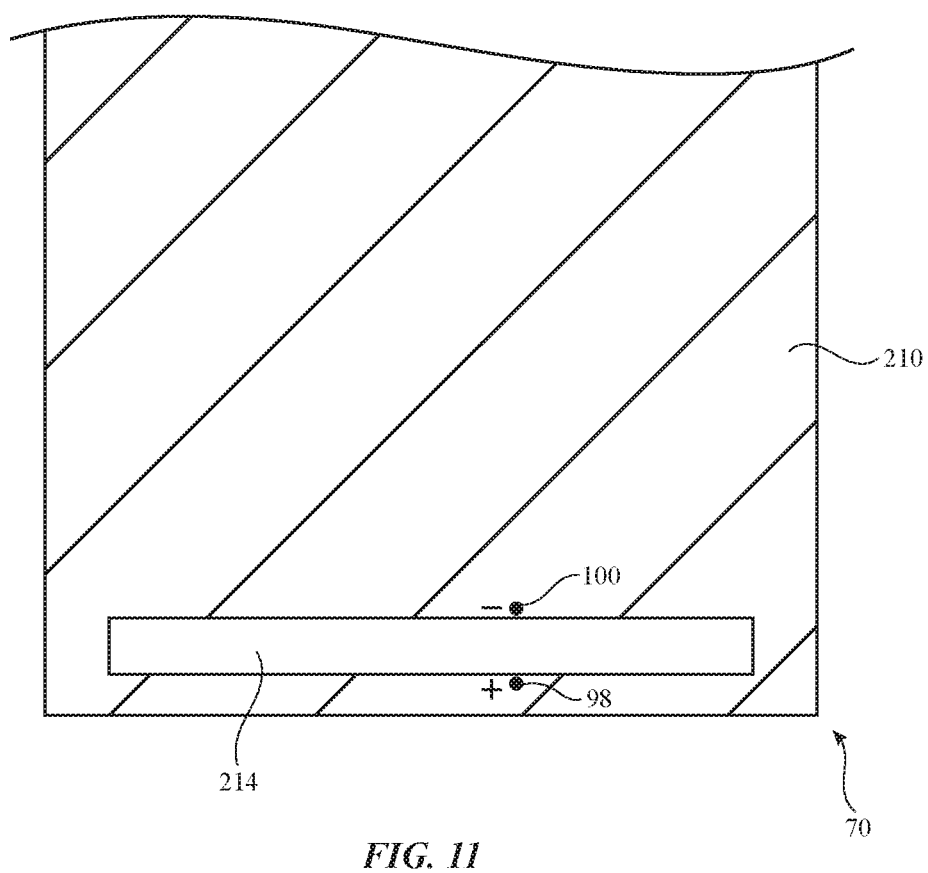
FIG. 11 is a schematic diagram of an illustrative slot antenna in accordance with an embodiment.

Antenna 40 may be a hybrid antenna that includes one or more slot antenna resonating elements. As shown in FIG. 11, for example, antenna 40 may be based on a slot antenna configuration having an opening such as slot 214 that is formed within conductive structures such as antenna ground 210. Slot 214 may be filled with air, plastic, and/or other dielectric. The shape of slot 214 may be straight or may have one or more bends (i.e., slot 214 may have an elongated shape following a meandering path). The antenna feed for antenna 40 may include positive antenna feed terminal 98 and ground antenna feed terminal 100. Feed terminals 98 and 100 may, for example, be located on opposing sides of slot 214 (e.g., on opposing long sides). Slot-based antenna resonating elements such as slot antenna resonating element 214 of FIG. 5 may give rise to an antenna resonance at frequencies in which the wavelength of the antenna signals is equal to the perimeter of the slot. In narrow slots, the resonant frequency of a slot antenna resonating element is associated with signal frequencies at which the slot length is equal to a half of a wavelength. Slot antenna frequency response can be tuned using one or more tuning components (e.g., adjustable components 102 and fixed tuning components 104 of FIG. 3) such as integrated inductors 198 (FIG. 8) or integrated capacitors 142 (FIGS. 6 and 7). These components may have terminals that are coupled to opposing sides of the slot (i.e., the tunable components may bridge the slot). If desired, tunable components may have terminals that are coupled to respective locations along the length of one of the sides of slot 214. Combinations of these arrangements may also be used.

Figure 12:
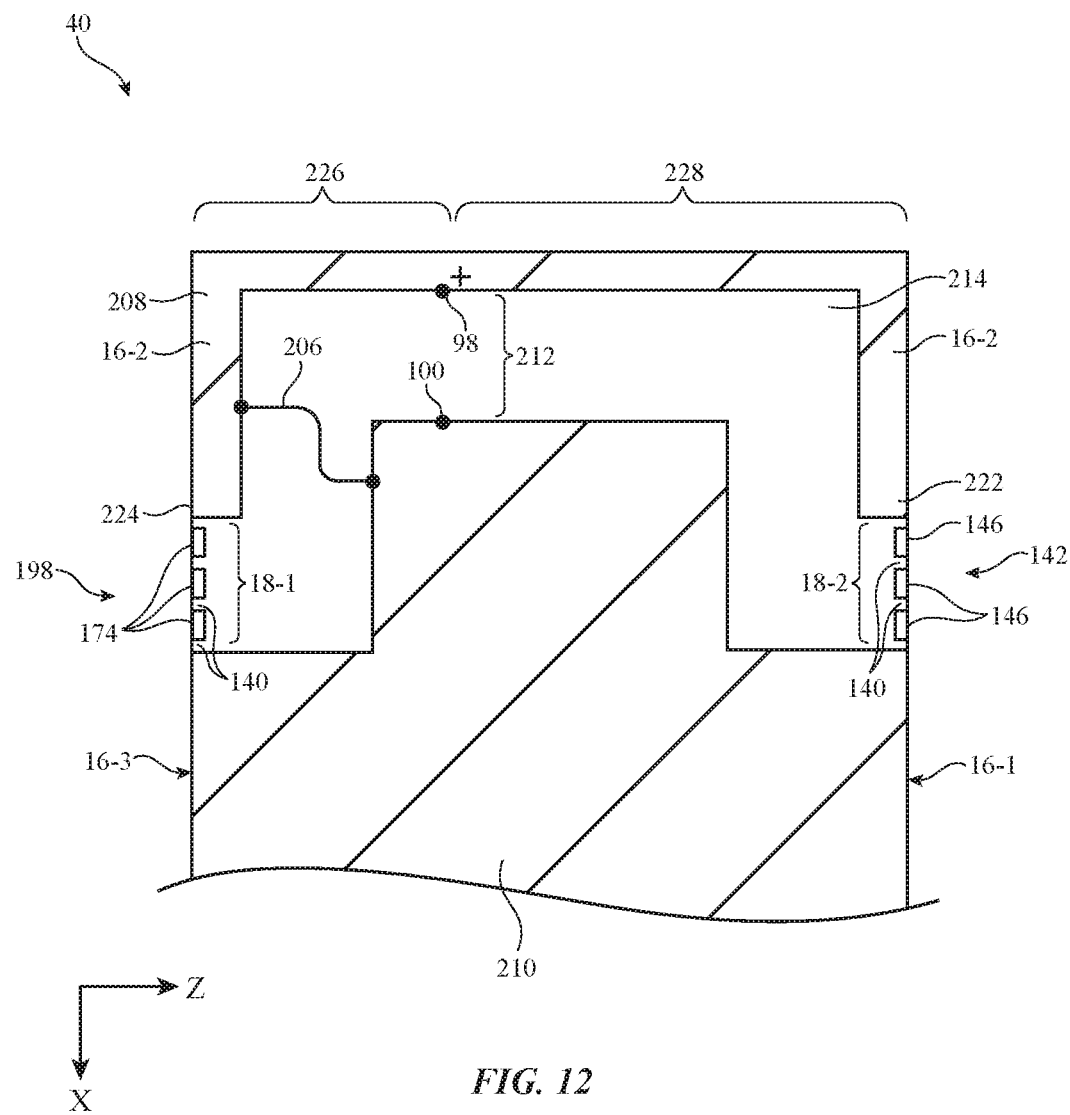
FIGS. 12 and 13 are diagrams of illustrative hybrid inverted-F slot antenna structures having tuning components formed from optically continuous patterned regions of conductive housing walls in accordance with an embodiment.

Antenna 40 may be a hybrid slot-inverted-F antenna that includes resonating elements of the type shown in both FIG. 10 and FIG. 11. An illustrative configuration for an antenna with slot and inverted-F antenna structures is shown in FIG. 12. As shown in FIG. 12, antenna 40 (e.g., a hybrid slot-inverted-F antenna) may be fed by transceiver circuitry 42 that is coupled to antenna feed 212 over radio-frequency transmission line 92 (FIG. 2). Antenna 40 may include a slot such as slot 214 that is formed from an elongated gap between peripheral conductive structures 16 and ground 210. Slot 214 may, for example, be formed from gap 200 of FIG. 9. Ground 210 may include portions of rear housing wall 12R or other metal layers within device 10. Slot 214 may be filled with dielectrics such as air, ceramic, glass, and/or plastic. For example, plastic may be inserted into portions of slot 214 and this plastic may be flush with the outside of housing 12. Antenna 40 as shown in FIG. 12 may be formed within upper region 22 or lower region 18 of device 10 (FIG. 1), for example.

Feed 212 may be coupled across slot 214. For example, positive antenna feed terminal 98 may be coupled to segment 16-2 of peripheral conductive structures 16 whereas ground antenna feed terminal 100 is formed on ground plane 214. Portions of slot 214 may contribute slot antenna resonances to antenna 40. Segment 16-2 of peripheral conductive structures 16 may form an antenna resonating element arm such as arm 208 of FIG. 10 that extends between gaps 18-1 and 18-2 (e.g., gaps 18 in peripheral conductive structures 16 as shown in FIGS. 1 and 9). Segment 16-2 may have a first end 224 that is separated from segment 16-3 of peripheral conductive structures 16 by gap 18-1 and a second end 222 that is separated from segment 16-2 of peripheral structures 16 by gap 18-2. The length of antenna resonating element arm 208 (e.g., segment 16-2 extending from end 224 adjacent to gap 18-1 to end 222 adjacent to gap 18-2) may be selected so that antenna 40 resonates at desired operating frequencies. A return path such as path 206 of FIG. 10 may be formed by a fixed conductive path bridging slot 214 or a tuning component such as components 102 and/or 104 of FIG. 3.

Slot 214 may have an elongated shape (e.g., a slot shape) or other suitable elongated gap shape. In the example of FIG. 12, slot 214 has a U shape that runs along the periphery of device 10 between segment 16-2 (e.g., housing sidewalls) and portions of the rear wall 12R of device 10 (e.g., ground 210). The ends of slot 214 may be formed by gaps 18-1 and 18-2. The length of slot 214 may be about 4-20 cm, more than 2 cm, more than 4 cm, more than 8 cm, more than 12 cm, less than 25 cm, less than 15 cm, less than 10 cm, or any other suitable length. Slot 214 may have a width of about 2 mm (e.g., less than 4 mm, less than 3 mm, less than 2 mm, more than 1 mm, more than 1.5 mm, 1-3 mm, etc.) or any other suitable width. If desired, slot 114 may have other shapes such as a straight slot shape.

Antenna 40 may be used to support communications in multiple frequency bands. For example, antenna 40 may support communications in a low band LB (e.g., frequencies from 600 MHz to 960 MHz as shown in FIG. 4), a midband MB that includes higher frequencies than the low band (e.g., frequencies from 1710 MHz to 2170 MHz), and a high band HB that includes higher frequencies than the midband (e.g., frequencies from 2300 MHz to 2700 MHz). If desired, antenna 40 may also support communications in a low-mid band between the low band and the midband (e.g., frequencies from 960 MHz to 1710 MHz) or any other band from 600 MHz to 4000 MHz. As shown in FIG. 12, portion 226 of antenna resonating element arm 208 (e.g., peripheral housing segment 16-2) extending from positive feed terminal 98 to end 224 and ground plane 210 may be used to support a resonance in the midband. If desired, slot 214 between resonating element portion 226 and ground 210 (e.g., a fundamental or harmonic frequency of slot 214) or a parasitic antenna resonating element adjacent to portion 226 may support a resonance in the high band. Portion 228 of antenna resonating element arm 208 (e.g., peripheral housing segment 16-2) extending from positive feed terminal 98 to end 222 may be used to support a resonance in the low band.

The impedance of gaps 18-1 and 18-2 may be dependent upon the frequency of operation of portions 226 and 228 of resonating element arm 208, respectively. For example, at frequencies in the midband, the capacitance across gap 18-1 (e.g., between end 224 and segment 16-3) may be excessively high and can reduce the antenna efficiency of antenna 40 within midband MB. At the same time, at least some capacitance across gap 18-1 is required in order for antenna 40 to exhibit satisfactory midband antenna efficiency. To counteract this excessive capacitance (e.g., without completely removing all capacitance between end 224 and segment 16-3), an inductive component such as integrated inductor 198 of FIG. 8 may be formed in gap 18-1.

For example, un-patterned region 134-1 of conductive layer 130 of FIG. 8 may be formed from segment 16-3 and un-patterned region 134-2 of conductive layer 130 may be formed from segment 16-2 of housing sidewalls 16 (e.g., housing sidewall 16 may form conductive layer 130 of FIG. 8). Patterned region 132 of conductive layer 130 of FIG. 8 may be formed within gap 18-1 and may include slots 140 that divide the conductive material in gap 18-1 into meandering conductive path 174. The width of gap 18-1 may be equal to width 148 of FIG. 8 and may be fixed design constraints associated with device 10, for example. While not shown for the sake of clarity in FIG. 12, a first end of conductive path 174 is connected to end 224 of segment 16-2 and a second end of conductive path 174 is connected to segment 16-3 of housing sidewalls 16.

Conductive meandering path 174 may have dimensions that are selected to provide integrated inductor 198 with a selected inductance and self-capacitance. The inductance and self-capacitance may be selected to counteract any excessive capacitance associated with gap 18-1 in the absence of conductive material in gap 18-1, thereby enhancing the midband antenna efficiency of antenna 40. Slots 140 in component 198 may be sufficiently small (e.g., having a width 150 that is less than 200 microns as shown in FIG. 8) so that gap 18-1 is invisible to the un-aided eye of a user of device 10. In other words, when configured in this way, segment 16-2, gap 18-1, and segment 16-3 may appear to the user as a single continuous piece of conductive material. This may, for example, serve to enhance the overall aesthetic appearance of device 10 to the user without sacrificing antenna performance.

At frequencies in low band LB (FIG. 4), the capacitance across gap 18-2 (e.g., between end 222 and segment 16-1) may be excessively high and can reduce the antenna efficiency for antenna 40 within low band LB. However, the impact of the capacitance across gap 18-2 in low band LB may be less than that of the capacitance across gap 18-1 in midband MB. As such, whereas introduction of inductance into gap 18-1 may be required to obtain satisfactory antenna efficiency in the midband for portion 226 of antenna 40, an inductance need not be introduced into gap 18-2 to obtain satisfactory low band antenna efficiency. If desired, the capacitance of gap 18-2 may be reduced by forming a capacitive component such as integrated capacitor 142 of FIGS. 6 and 7 in gap 18-2.

For example, un-patterned region 134-1 of conductive layer 130 of FIGS. 6 and 7 may be formed from segment 16-2 and un-patterned region 134-2 of conductive layer 130 may be formed from segment 16-1 of housing sidewalls 16 (e.g., housing sidewall 16 may form conductive layer 130). The width of gap 18-2 may be equal to width 148 of FIGS. 6 and 7 and may be fixed design constraints associated with device 10, for example. Patterned region 132 of conductive layer 130 of FIGS. 6 and 7 may be formed within gap 18-2 such that gap 18-2 includes a one or two-dimensional array of conductive patches 146 that are separated by slots 140. Because conductive patches 146 form at least one set of series-coupled capacitors between end 222 and segment 16-1, the corresponding capacitances add in series to reduce the overall capacitance between segment 16-2 and segment 16-1 relative to scenarios were no conductive material is formed in gap 18-2. Conductive patches 146 and slots 140 may have dimensions that are selected to provide integrated capacitor 198 with a selected capacitance. The capacitance may be selected to reduce the overall capacitance associated with gap 18-2 relative to the capacitance in the absence of conductive material within gap 18-2 by a predetermined amount, thereby enhancing the low band antenna efficiency of antenna 40. Slots 140 in component 142 may be sufficiently small (e.g., having a width 150 that is less than 200 microns as shown in FIGS. 6 and 7) so that gap 18-2 is invisible to the un-aided eye of a user of device 10. In other words, when configured in this way, segment 16-2, gap 18-2, and segment 16-1 may appear to the user as a single continuous piece of conductive material. This may, for example, serve to enhance the overall aesthetic appearance of device 10 to the user without sacrificing antenna performance.

As shown in FIG. 12, the thickness of conductive path 174 (e.g., thickness 154' of FIG. 8 or the dimension of path 174 in the direction of the Z-axis in FIG. 12) may be less than the thickness of segments 16-2, 16-3, and 16-1 (e.g., thickness 154 of regions 134-1 and 134-2 of FIG. 8). Similarly, the thickness of conductive patches 146 (e.g., thickness 154' of FIGS. 6 and 7 or the dimension of patches 146 in the direction of the Z-axis in FIG. 12) may be less than the thickness of segments 16-2, 16-3, and 16-1. If desired, conductive path 174 and/or patches 146 may be formed from conductive traces or other metal structures on a dielectric substrate (e.g., substrate 144 of FIGS. 6-8) within the interior of device 10. Segments 16-1, 16-3, and 16-2 may also be formed on dielectric substrate 144 or may be free from substrate 144. In another suitable arrangement, conductive path 174 and/or patches 146 may be formed from conductive housing sidewalls 16. For example, slots 140 in components 142 and/or 198 may be formed from etching or cutting slots 140 directly into housing sidewalls 16.

If desired, peripheral conductive segment 16 may include an additional dielectric gap such as optional dielectric gap 18-3 of FIG. 9. If desired, multiple antennas 40 may be formed using peripheral conductive housing structures 16 having additional gap 18-3. An illustrative configuration in which two antennas are formed using three gaps 18 in sidewalls 16 is shown in FIG. 13.

Figure 13:
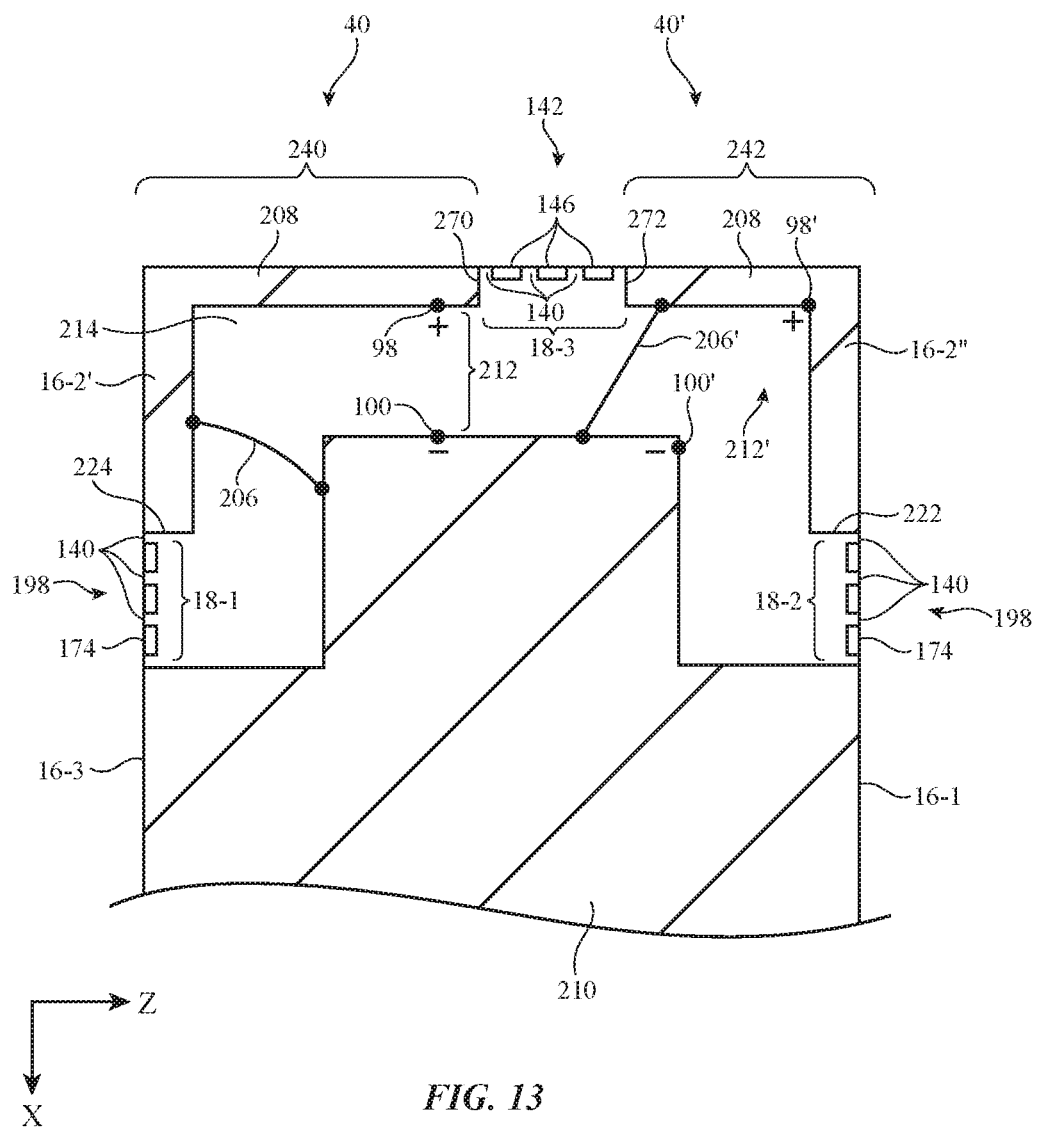

As shown in FIG. 13, third gap 18-3 may divide conductive housing segment 16-2 into a first portion 16-2' and 16-2". A first antenna 40 may be formed in region 240 and may include antenna feed 212, an antenna resonating element arm 208 formed from housing portion 16-2' between a first end 224 and opposing second end 270, return path 206, and ground plane 210. A second antenna 40' may be formed in region 242 and may include antenna feed 212', an antenna resonating element arm 208' formed from housing portion 16-2'' between a first end 222 and opposing second end 272, return path 206', and ground plane 210. Antenna feed 212' may include a positive antenna feed terminal 98' coupled to housing portion 16-2'' and a ground antenna feed terminal 100' coupled to ground 210. The length of arm 208 of antenna 40 may be selected so that antenna 40 covers low band and high band frequencies. The length of arm 208' may be selected so that antenna 40' covers midband and high band frequencies. This is merely illustrative and, in general, antennas 40 and 40' may cover any desired frequencies. In one suitable arrangement, antennas 40 and 40' are configured to concurrently transmit and receive signals using a MIMO protocol (e.g., a protocol in which copies of the same data stream are concurrently transmitted or received over the high band using both antennas 40 and 40'). In general, MIMO communications may involve communications with higher overall data rates (e.g., throughputs) than scenarios where only a single antenna is used to convey a data stream.

At frequencies in the high band, the capacitance across gap 18-1 may be excessively high and can reduce the overall high band antenna efficiency for antenna 40. Similarly, at frequencies in the high band and midband, the capacitance across gap 18-2 may be excessively high and can reduce the overall high band and midband efficiency for antenna 40'. At the same time, at least some capacitance across gaps 18-1 and 18-2 is required in order for antennas 40 and 40' to exhibit satisfactory midband and high band efficiency. To counteract this excessive capacitance (e.g., without completely removing all capacitance between end 224 and segment 16-3 and between end 222 and segment 16-1), inductive components such as integrated inductor 198 of FIG. 8 may be formed in gaps 18-1 and 18-2.

For example, un-patterned region 134-1 of conductive layer 130 of FIG. 8 may be formed from segment 16-3 and un-patterned region 134-2 of conductive layer 130 may be formed from segment 16-2' of housing sidewalls 16. Patterned region 132 of conductive layer 130 of FIG. 8 may be formed within gap 18-1 and may include slots 140 that divide the conductive material in gap 18-1 into meandering conductive path 174. Similarly in antenna 40', un-patterned region 134-1 may be formed from segment 16-2'' and un-patterned region 134-2 may be formed from segment 16-1. Slots 140 may divide the conductive material in gap 18-2 into meandering conductive path 174. Slots 140 and conductive meandering paths 174 in gaps 18-1 and 18-2 may have dimensions that are selected to provide integrated inductors 198 with predetermined inductances and self-capacitances. The predetermined inductances and self-capacitances may be selected to counteract any excessive capacitance associated with gaps 18-1 and 18-2, thereby enhancing the high band antenna efficiency of antenna 40 and the midband and high band antenna efficiencies of antenna 40'. Slots 140 in component 198 may be sufficiently small so that gaps 18-1 and 18-2 are invisible to the un-aided eye of a user of device 10.

In order to enhance isolation between antenna 40 and 40', the capacitance of gap 18-3 may be reduced by forming a capacitive tuning component such as integrated capacitor 142 of FIGS. 6 and 7 in gap 18-3. For example, un-patterned region 134-1 may be formed from segment 16-2' and un-patterned region 134-2 may be formed from segment 16-2'' of housing sidewalls 16 (e.g., housing sidewall 16 may form conductive layer 130 of FIG. 8). Slots 140 may divide the conductive material in gap 18-3 into a one or two-dimensional array of conductive patches 146. Because conductive patches 146 form a set of series-coupled capacitors between segment 16-2' and segment 16-2'', the corresponding capacitances add in series to reduce the overall capacitance between segments 16-2' and 16-2''. Conductive patches 146 and slots 140 may have dimensions that are selected to provide integrated capacitor 142 with a predetermined capacitance. The predetermined capacitance may be selected to reduce the overall capacitance associated with gap 18-3 by a predetermined amount, thereby enhancing isolation between antennas 40 and 40'. Slots 140 in component 142 may be sufficiently small so that gap 18-3 is invisible to the un-aided eye of a user of device 10. In other words, when configured in this way, segment 16-2', gap 18-3, and segment 16-2'' may appear to the user as a single continuous piece of conductive material.

As shown in FIG. 13, the thickness of conductive paths 174 may be less than the thickness of segments 16-2', 16-2'', 16-1, and 16-3. Similarly, the thickness of conductive patches 146 may be less than the thickness of segments 16-2' and 16-2''. If desired, conductive paths 174 and/or patches 146 may be formed from conductive traces or other metal structures on a dielectric substrate (e.g., substrate 144 of FIGS. 6-8) within the interior of device 10. Segments 16-1, 16-3, 16-2', and 16-2'' may also be formed on dielectric substrate 144 or may be free from substrate 144. In another suitable arrangement, conductive paths 174 and/or patches 146 may be formed from conductive housing sidewalls 16. For example, slots 140 in components 142 and/or 198 may be formed from etching or cutting slots 140 directly into housing sidewalls 16.

Figure 14:
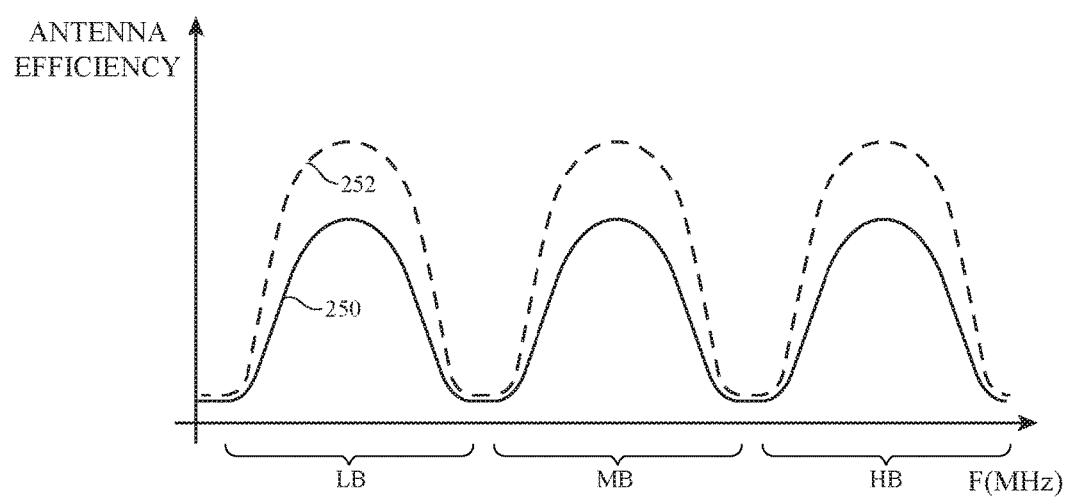
FIG. 14 is a graph of antenna performance (antenna efficiency) for illustrative antenna structures of the type shown in FIGS. 12 and 13 in accordance with an embodiment.

FIG. 14 is a graph in which antenna performance (antenna efficiency) has been plotted as a function of operating frequency f for an illustrative antenna such as antennas 40 and 40' of FIGS. 12 and 13 (including conductive antenna tuning components formed within gaps 18). As shown in FIG. 14, antennas 40 and/or 40' may exhibit resonances in a low band LB, midband MB, and high band HB. Curve 250 exhibits the antenna efficiency of antennas 40 and/or 40' in the absence of antenna tuning components within gaps 18. Curve 252 exhibits the antenna efficiency of antenna 40 and/or 40' when formed with antenna tuning components within gaps 18 (e.g., with integrated inductor 198 in gap 18-1 and integrated capacitor 142 in gap 18-2 as shown in FIG. 12 or with integrated inductors 198 in gaps 18-1 and 18-2 and integrated capacitor 142 in gap 18-3 as shown in FIG. 13).

Low band LB may extend from 600 MHz to 960 MHz or other suitable frequency range. Peripheral conductive structures 16 may serve as an inverted-F resonating element arm such as arm 208 of FIG. 12. The resonance of antenna 40 at low band LB may be associated with the distance along peripheral conductive structures 16-2 between feed 212 of FIGS. 12 and 13 and gap 18-2.

Midband MB may extend from 1710 MHz to 2170 MHz or other suitable frequency range. The resonance of antenna 40 and/or 40' at midband MB may be associated with the distance along peripheral conductive structures 16-2 between feed 212 of FIG. 12 and gap 18-1 or with the distance along peripheral conductive structures 16-2'' between feed 212' and gap 18-2 of FIG. 13.

High band HB may extend from 2300 MHz to 2700 MHz or other suitable frequency range. Antenna performance in high band HB may be supported by the resonance of slot 214. As shown in FIG. 14, in the absence of components 198 and 142, antennas 40 and/or 40' may exhibit a first antenna efficiency 250 having a first set of peaks. In the presence of components 198 and 142, antennas 40 and/or 40' may exhibit a second antenna efficiency 252 having a second set of peaks that are greater than the first set of peaks. The increase in antenna efficiency in low band LB may, for example, be generated by the presence of integrated capacitors 142 within gaps 18 (e.g., within gap 18-2 of FIG. 12 or gap 18-3 as shown in FIG. 13). The increase in antenna efficiency in midband MB and high band HB may, for example, be generated by the presence of integrated inductors 198 within gaps 18 (e.g., within gap 18-1 as shown in FIG. 12 or gaps 18-1 and 18-2 as shown in FIG. 13). The example of FIG. 14 is merely illustrative. In general, the efficiency curve associated with antenna 40 may have any desired shape. Antenna 40 may exhibit peaks in efficiency in more than three frequency bands or in fewer than three frequency bands if desired.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a housing having a peripheral conductive sidewall that includes first and second segments;
   an antenna having a resonating element arm that includes the first segment of the peripheral conductive sidewall, an antenna ground that includes the second segment of the peripheral conductive sidewall, and an antenna tuning component; and
   a plurality of slots in the peripheral conductive sidewall between the first and second segments, wherein the plurality of slots divide the peripheral conductive sidewall into conductive structures between the first and second segments and the antenna tuning component comprises the plurality of slots and the conductive structures.

2. The electronic device defined in claim 1, wherein the antenna tuning component comprises a capacitor and the conductive structures comprise a conductive patch.

3. The electronic device defined in claim 2, wherein the conductive patch is one of a plurality of conductive patches in the capacitor that are separated by the plurality of slots and that are arranged in a one-dimensional array between the first and second segments of the peripheral conductive sidewall.

4. The electronic device defined in claim 2, wherein the conductive patch is one of a plurality of conductive patches in the capacitor and the plurality of slots are arranged in a grid that divides the plurality of conductive patches into a two-dimensional array of conductive patches between the first and second segments of the peripheral conductive sidewall.

5. The electronic device defined in claim 2, wherein the antenna tuning component comprises an inductor and the conductive structures comprise a meandering conductive path having a first end coupled to the first segment of the peripheral conductive sidewall and a second end coupled to the second segment of the peripheral conductive sidewall.

6. The electronic device defined in claim 5, wherein the electronic device has opposing first and second faces, further comprising:
   a display having a display cover layer at the first face, wherein the housing comprises a rear wall at the second face, the peripheral conductive sidewall has a first edge at the first face and a second edge at the second face, the plurality of slots comprises a first set of slots extending from the first edge and a second set of slots extending from the second edge of the peripheral conductive sidewall, and the first set of slots are laterally offset with respect to the second set of slots.

7. The electronic device defined in claim 1, wherein the housing comprises a first additional peripheral conductive sidewall that includes third and fourth segments and a second additional peripheral conductive sidewall that extends between the third segment of the first additional peripheral conductive sidewall and the first segment of the peripheral conductive sidewall, further comprising:
   an additional plurality of slots in the first additional peripheral conductive sidewall between the third and fourth segments, wherein the additional plurality of slots divide the first additional peripheral conductive sidewall into additional conductive structures between the third and fourth segments, the resonating element arm includes the second additional peripheral conductive sidewall and the third segment, the antenna ground includes the fourth segment, and the antenna further includes an additional antenna tuning component that includes the additional plurality of slots and the additional conductive structures.

8. The electronic device defined in claim 7, wherein the antenna is configured to convey radio-frequency signals in a first frequency band and a second frequency band that is higher than the first frequency band, the first segment of the peripheral conductive sidewall and the antenna ground are configured to handle radio-frequency signals in the first frequency band, and the third segment of the first additional peripheral conductive sidewall and the antenna ground are configured to handle radio-frequency signals in the second frequency band.

9. The electronic device defined in claim 8, wherein the antenna tuning component comprises a capacitor, the conductive structures comprise a plurality of conductive patches that form series-coupled capacitances for the capacitor, the additional antenna tuning component comprises an inductor, and the additional conductive structures comprise a meandering conductive path having a first end coupled to the third segment and a second end coupled to the fourth segment of the first additional peripheral conductive sidewall.

10. The electronic device defined in claim 1, wherein the housing comprises a first additional peripheral conductive sidewall having third and fourth segments and a second additional peripheral conductive sidewall having fifth and sixth segments, the resonating element arm includes the sixth segment, and the antenna ground includes the fourth segment, the electronic device further comprising:
   a first additional plurality of slots in the first additional peripheral conductive sidewall between the third and fourth segments, wherein the first additional plurality of slots divide the first additional peripheral conductive sidewall into first additional conductive structures between the third and fourth segments;
   a second additional plurality of slots in the second additional peripheral conductive sidewall between the fifth and sixth segments, wherein the second additional plurality of slots divide the second additional peripheral conductive sidewall into second additional conductive structures between the fifth and sixth segments; and
   an additional antenna that includes an additional resonating element arm formed from the third and fifth segments, the antenna ground, and an additional antenna tuning component that includes the first additional plurality of slots and the first additional conductive structures in the first additional peripheral conductive sidewall.

11. The electronic device defined in claim 10, wherein the antenna tuning component comprises a first inductor, the conductive structures comprise a first meandering conductive path having a first end coupled to the first segment and a second end coupled to the second segment, the additional antenna tuning component comprises a second inductor, the first additional conductive structures comprise a second meandering conductive path coupled between the third and fourth segments, and the second additional conductive structures comprise a plurality of conductive patches that form series-coupled capacitances between the fifth and sixth segments of the second additional peripheral conductive sidewall.

12. The electronic device defined in claim 1, wherein the electronic device has opposing front and rear faces, the peripheral conductive sidewall extends from the front face to the rear face, and each slot in the plurality of slots extends from the front face to the rear face and has a width that is less than 100 microns.

13. An electronic device, comprising:
a conductive layer that includes first and second continuous regions and a patterned region having opposing first and second edges, wherein the first edge is defined by the first continuous region, the second edge is defined by the second continuous region, and the patterned region comprises a plurality of openings in the conductive layer; and
an antenna having an antenna resonating element that includes the first continuous region of the conductive layer, an antenna ground that includes the second continuous region of the conductive layer, and an antenna tuning element formed from the patterned region of the conductive layer.

14. The electronic device defined in claim 13, wherein the first and second continuous regions have a first reflectivity to visible light and the patterned region has a second reflectivity to visible light that is within 20% of the first reflectivity.

15. The electronic device defined in claim 14, wherein the plurality of openings in the patterned region divide the conductive layer within the patterned region into an array of conductive patches that exhibit a series-coupled capacitance between the first and second continuous regions of the conductive layer.

16. The electronic device defined in claim 14, wherein the first continuous region is separated from the second continuous region by a given distance, the plurality of openings in the patterned region divide the conductive layer within the patterned region into a meandering conductive path that exhibits an inductance and has an electrical path length between the first and second continuous regions that is greater than the given distance.

17. The electronic device defined in claim 14, wherein the electronic device has a first face and an opposing second face, the conductive layer comprises a peripheral conductive housing wall for the electronic device that extends from the first face to the second face, and each opening in the patterned region extends from the first face to the second face.

18. The electronic device defined in claim 17, wherein the patterned region has a width from the first continuous region to the second continuous regions that is less than 3 mm, a dimension of the peripheral conductive housing wall from the first face to the second face is less than 10 mm, and each opening in the patterned region has a width that is less than 100 microns.

19. An electronic device comprising:
a housing having a conductive housing wall, wherein the conductive housing wall comprises a first solid region, a second solid region, and a patterned region extending between the first and second solid regions, wherein the patterned region includes conductive structures that are separated by gaps in the conductive housing wall, the first and second solid regions have a first reflectivity to visible light, and the patterned region has a second reflectivity to visible light that is within 20% of the first reflectivity; and
an antenna having an antenna resonating element that includes the first solid region, an antenna ground that includes the second solid region, and a capacitor coupled between the antenna resonating element and the antenna ground, wherein the capacitor is formed from the patterned region of the conductive housing wall.

20. The electronic device defined in claim 19, wherein the conductive structures comprise a plurality of conductive patches that are arranged in an array between the first and second solid regions and each of the gaps in the patterned region has a width that is less than 100 microns.

* * * * *